US010508567B2

(12) United States Patent
Stachowiak et al.

(10) Patent No.: US 10,508,567 B2
(45) Date of Patent: Dec. 17, 2019

(54) AUXILIARY DRIVE BOWED ROTOR PREVENTION SYSTEM FOR A GAS TURBINE ENGINE THROUGH AN ENGINE ACCESSORY

(71) Applicant: United Technologies Corporation, Farmington, CT (US)

(72) Inventors: David Allen Stachowiak, Manchester, CT (US); William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 682 days.

(21) Appl. No.: 15/161,450

(22) Filed: May 23, 2016

(65) Prior Publication Data

US 2017/0234167 A1  Aug. 17, 2017

Related U.S. Application Data

(63) Continuation-in-part of application No. 15/042,794, filed on Feb. 12, 2016.

(51) Int. Cl.
*F01D 25/36* (2006.01)
*F02C 7/32* (2006.01)
(Continued)

(52) U.S. Cl.
CPC .............. *F01D 25/36* (2013.01); *B64D 27/16* (2013.01); *B64D 35/00* (2013.01); *F01D 21/00* (2013.01);
(Continued)

(58) Field of Classification Search
CPC .......... F02C 7/262; F02C 7/268; F02C 7/275; F02C 7/32; F05D 2260/85; F01D 25/04; F01D 25/36
See application file for complete search history.

(56) References Cited

U.S. PATENT DOCUMENTS 1,951,875 A    3/1934 Laabs
2,617,253 A   11/1952 Fusner et al.
(Continued)

FOREIGN PATENT DOCUMENTS

EP    1396611       3/2004
EP    1533479 A2    5/2005
(Continued)

OTHER PUBLICATIONS

EP Application No. 17155683 Office Action dated May 22, 2018, 2 pages.
(Continued)

*Primary Examiner* — Andrew H Nguyen
(74) *Attorney, Agent, or Firm* — Cantor Colburn LLP

(57) ABSTRACT

A bowed rotor prevention system for a gas turbine engine of an aircraft is provided. The bowed rotor prevention system includes a gear train and a bowed rotor prevention motor. The gear train is coupled through an engine accessory to an engine accessory gearbox that is further coupled to a starting spool of the engine. The bowed rotor prevention motor is operable to drive rotation of the starting spool of the gas turbine engine through the gear train upon engine shutdown.

18 Claims, 14 Drawing Sheets

(51) Int. Cl.
  *F01D 21/00* (2006.01)
  *B64D 27/16* (2006.01)
  *B64D 35/00* (2006.01)
  *B64D 41/00* (2006.01)

(52) U.S. Cl.
  CPC .......... *F02C 7/32* (2013.01); *B64D 2041/002* (2013.01); *B64D 2041/005* (2013.01); *F05D 2260/20* (2013.01); *F05D 2270/114* (2013.01)

(56) References Cited

U.S. PATENT DOCUMENTS

| | | | |
|---|---|---|---|
| 2,962,597 A * | 11/1960 | Evans | F01D 25/36 290/2 |
| 3,057,155 A | 10/1962 | Rizk | |
| 3,151,452 A | 10/1964 | Bunger et al. | |
| 3,290,709 A | 12/1966 | Whitenack, Jr. et al. | |
| 3,360,844 A | 1/1968 | Wonneman | |
| 3,764,815 A | 10/1973 | Habock et al. | |
| 3,793,905 A | 2/1974 | Black et al. | |
| 3,898,439 A | 8/1975 | Reed et al. | |
| 3,951,008 A | 4/1976 | Schneider et al. | |
| 4,044,550 A | 8/1977 | Vermilye | |
| 4,069,424 A | 1/1978 | Burkett | |
| 4,120,159 A | 10/1978 | Matsumoto et al. | |
| 4,144,421 A | 3/1979 | Sakai | |
| 4,302,813 A | 11/1981 | Kurihara et al. | |
| 4,353,604 A | 10/1982 | Dulberger et al. | |
| 4,380,146 A | 4/1983 | Yannone et al. | |
| 4,426,641 A | 1/1984 | Kurihara et al. | |
| 4,435,770 A | 3/1984 | Shiohata et al. | |
| 4,437,163 A | 3/1984 | Kurihara et al. | |
| 4,453,407 A | 6/1984 | Sato et al. | |
| 4,485,678 A | 12/1984 | Fanuele | |
| 4,488,240 A | 12/1984 | Kapadia et al. | |
| 4,496,252 A | 1/1985 | Horler et al. | |
| 4,598,551 A | 7/1986 | Dimitroff, Jr. et al. | |
| 4,627,234 A | 12/1986 | Schuh | |
| 4,642,782 A | 2/1987 | Kemper et al. | |
| 4,669,893 A | 6/1987 | Chalaire et al. | |
| 4,713,985 A | 12/1987 | Ando | |
| 4,733,529 A | 3/1988 | Nelson et al. | |
| 4,747,270 A | 5/1988 | Klie et al. | |
| 4,854,120 A * | 8/1989 | Nelson | F01D 21/06 60/772 |
| 4,862,009 A * | 8/1989 | King | F02N 11/04 290/22 |
| 4,979,362 A | 12/1990 | Vershure, Jr. | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 6,146,090 A | 11/2000 | Schmidt | |
| 6,168,377 B1 | 1/2001 | Wolfe et al. | |
| 6,190,127 B1 | 2/2001 | Schmidt | |
| 6,318,958 B1 | 11/2001 | Giesler et al. | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,798,720 B1 | 9/2010 | Walsh | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,770,913 B1 | 7/2014 | Negron et al. | |
| 8,776,530 B2 | 7/2014 | Shirooni et al. | |
| 8,820,046 B2 * | 9/2014 | Ross | F02C 7/26 60/39.13 |
| 8,918,264 B2 | 12/2014 | Jegu et al. | |
| 9,086,018 B2 | 7/2015 | Winston et al. | |
| 9,121,309 B2 | 9/2015 | Geiger | |
| 9,429,510 B2 | 8/2016 | Belsom et al. | |
| 9,664,070 B1 | 5/2017 | Clauson et al. | |
| 9,699,833 B2 | 7/2017 | Broughton et al. | |
| 9,845,730 B2 | 12/2017 | Betti et al. | |
| 9,988,928 B2 | 6/2018 | Popescu et al. | |
| 2002/0173897 A1 | 11/2002 | Leamy et al. | |
| 2003/0145603 A1 | 8/2003 | Reed et al. | |
| 2004/0065091 A1 | 4/2004 | Anderson | |
| 2004/0131138 A1 | 7/2004 | Correia et al. | |
| 2006/0032234 A1 | 2/2006 | Thompson | |
| 2006/0188372 A1 * | 8/2006 | Hansen | F01D 25/36 416/169 R |
| 2006/0260323 A1 | 11/2006 | Moulebhar | |
| 2007/0031249 A1 | 2/2007 | Jones | |
| 2007/0151258 A1 | 7/2007 | Gaines et al. | |
| 2008/0072568 A1 | 3/2008 | Moniz et al. | |
| 2009/0246018 A1 | 10/2009 | Kondo et al. | |
| 2009/0301053 A1 | 12/2009 | Geiger | |
| 2009/0314002 A1 | 12/2009 | Libera et al. | |
| 2010/0095791 A1 | 4/2010 | Galloway | |
| 2010/0132365 A1 | 6/2010 | Labala | |
| 2010/0293961 A1 | 11/2010 | Tong et al. | |
| 2010/0326085 A1 | 12/2010 | Veilleux | |
| 2011/0077783 A1 | 3/2011 | Karpman et al. | |
| 2011/0146276 A1 | 6/2011 | Sathyanarayana et al. | |
| 2011/0153295 A1 | 6/2011 | Yerramalla et al. | |
| 2011/0296843 A1 | 12/2011 | Lawson, Jr. | |
| 2011/0308345 A1 * | 12/2011 | Makulec | F01D 5/026 74/438 |
| 2012/0031067 A1 | 2/2012 | Sundaram et al. | |
| 2012/0240591 A1 | 9/2012 | Snider et al. | |
| 2012/0266601 A1 | 10/2012 | Miller | |
| 2012/0316748 A1 | 12/2012 | Jegu et al. | |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0134719 A1 | 5/2013 | Watanabe et al. | |
| 2013/0251501 A1 | 9/2013 | Araki et al. | |
| 2014/0060076 A1 | 3/2014 | Cortelli et al. | |
| 2014/0123673 A1 | 5/2014 | Mouze et al. | |
| 2014/0199157 A1 | 7/2014 | Haerms et al. | |
| 2014/0236451 A1 | 8/2014 | Gerez et al. | |
| 2014/0241878 A1 | 8/2014 | Herrig et al. | |
| 2014/0271152 A1 | 9/2014 | Rodriguez | |
| 2014/0301820 A1 | 10/2014 | Lohse et al. | |
| 2014/0318144 A1 | 10/2014 | Lazzeri et al. | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0016949 A1 | 1/2015 | Smith | |
| 2015/0115608 A1 | 4/2015 | Draper | |
| 2015/0121874 A1 | 5/2015 | Yoshida et al. | |
| 2015/0128592 A1 | 5/2015 | Filiputti et al. | |
| 2015/0159625 A1 | 6/2015 | Hawdwicke, Jr. et al. | |
| 2015/0219121 A1 | 8/2015 | King | |
| 2015/0377141 A1 | 12/2015 | Foiret | |
| 2016/0236369 A1 | 8/2016 | Baker | |
| 2016/0245312 A1 | 8/2016 | Morice | |
| 2016/0265387 A1 | 9/2016 | Duong et al. | |
| 2016/0288325 A1 | 10/2016 | Naderer et al. | |
| 2017/0030265 A1 | 2/2017 | O'Toole et al. | |
| 2017/0218848 A1 | 8/2017 | Alstad et al. | |
| 2017/0233103 A1 | 8/2017 | Teicholz et al. | |
| 2017/0234158 A1 | 8/2017 | Savela | |
| 2017/0234166 A1 | 8/2017 | Dube et al. | |

(56) References Cited

U.S. PATENT DOCUMENTS

| | | |
|---|---|---|
| 2017/0234230 A1 | 8/2017 | Schwarz et al. |
| 2017/0234231 A1 | 8/2017 | Virtue, Jr. et al. |
| 2017/0234232 A1 | 8/2017 | Sheridan et al. |
| 2017/0234233 A1 | 8/2017 | Schwarz et al. |
| 2017/0234235 A1 | 8/2017 | Pech |
| 2017/0234236 A1 | 8/2017 | Feulner et al. |
| 2017/0234238 A1 | 8/2017 | Schwarz et al. |
| 2018/0010480 A1 | 1/2018 | Hockaday et al. |
| 2018/0265223 A1 | 9/2018 | Teicholz et al. |
| 2018/0274390 A1 | 9/2018 | Clauson et al. |
| 2018/0327117 A1 | 11/2018 | Teicholz et al. |

FOREIGN PATENT DOCUMENTS

| | | |
|---|---|---|
| EP | 1862875 | 12/2007 |
| EP | 2006496 | 12/2008 |
| EP | 2305986 | 4/2011 |
| EP | 2363575 A2 | 9/2011 |
| EP | 2871333 | 5/2015 |
| EP | 3051074 | 8/2016 |
| FR | 2933131 | 1/2010 |
| GB | 1374810 | 11/1974 |
| GB | 2117842 | 10/1983 |
| GB | 2218751 | 11/1989 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2016069303 | 5/2016 |

OTHER PUBLICATIONS

EP Application No. 17155584 Extended European Search Report dated Jul. 6, 2017, 9 pages.
EP Application No. 17155601 Extended European Search Report dated Jun. 30, 2017, 7 pages.
EP Application No. 17155612 Extended European Search Report dated Jul. 4, 2017, 8 pages.
EP Application No. 17155613 Extended European Search Report dated Jun. 27, 2017, 10 pages.
EP Application No. 17155683 Extended European Search Report dated Jun. 30, 2017, 8 pages.
EP Application No. 17155687 Extended European Search Report dated Jun. 16, 2017, 9 pages.
EP Application No. 17155698 Extended European Search Report dated Jun. 21, 2017, 9 pages.
EP Application No. 17155721 Extended European Search Report dated Jun. 27, 2017, 8 pages.
EP Application No. 17155793 Extended European Search Report dated Jun. 30, 2017, 10 pages.
EP Application No. 17155798 Extended European Search Report dated Jun. 30, 2017, 9 pages.
EP Application No. 17155807 Extended European Search Report dated Jul. 3, 2017, 8 pages.
Extended European Search Report for Application No. 17179407.6-1610 dated Dec. 5, 2017 (8 pp.).
U.S. Appl. No. 15/042,331 Non-Final Office Action dated Sep. 9, 2016, 37 pages.
EP Application No. 17155612.9 Office Action dated Oct. 2, 2018, 3 pages.
EP Application No. 17155698.8 Office Action dated Sep. 27, 2018, 3 pages.
EP Application No. 17155798.6 Office Action dated Sep. 21, 2018, 3 pages.

* cited by examiner

AUXILIARY DRIVE BOWED ROTOR PREVENTION SYSTEM FOR A GAS TURBINE ENGINE THROUGH AN ENGINE ACCESSORY

CROSS REFERENCE TO RELATED APPLICATIONS

This application is a continuation-in-part of U.S. patent application Ser. No. 15/042,794, filed Feb. 12, 2016, the entire contents of which are specifically incorporated by reference herein.

BACKGROUND

This disclosure relates to gas turbine engines, and more particularly to an apparatus, system and method for avoiding a bowed rotor condition in the gas turbine engine using an auxiliary drive through an engine accessory.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for mitigating a "bowed rotor" condition.

BRIEF DESCRIPTION

In an embodiment, a bowed rotor prevention system for a gas turbine engine of an aircraft is provided. The bowed rotor prevention system includes a gear train and a bowed rotor prevention motor. The gear train is coupled through an engine accessory to an engine accessory gearbox that is further coupled to a starting spool of the engine. The bowed rotor prevention motor is operable to drive rotation of the starting spool of the gas turbine engine through the gear train upon engine shutdown.

In addition to one or more of the features described above, or as an alternative to any of the foregoing embodiments, further embodiments may include where the gear train includes a back-drive preventer that isolates the bowed rotor prevention motor from rotatable components of the gas turbine engine to inhibit the bowed rotor prevention motor from being back-driven.

In addition to one or more of the features described above, or as an alternative to any of the foregoing embodiments, further embodiments may include where the back-drive preventer is a clutch.

In addition to one or more of the features described above, or as an alternative to any of the foregoing embodiments, further embodiments may include where the bowed rotor prevention motor is an electric motor.

In addition to one or more of the features described above, or as an alternative to any of the foregoing embodiments, further embodiments may include an energy storage source to drive the electric motor, where the energy storage source is rechargeable by a generator on an aircraft electrical system.

In addition to one or more of the features described above, or as an alternative to any of the foregoing embodiments, further embodiments may include where the bowed rotor prevention motor is further operable to be driven by electrical power from an auxiliary energy source.

In addition to one or more of the features described above, or as an alternative to any of the foregoing embodiments, further embodiments may include where the bowed rotor prevention motor is further operable to drive rotation of the starting spool until a bowed rotor prevention shutdown request is detected. The bowed rotor prevention shutdown request can be detected based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

In addition to one or more of the features described above, or as an alternative to any of the foregoing embodiments, further embodiments may include where the gear train includes an epicyclic gear set coupled to a drive portion of the engine accessory.

In addition to one or more of the features described above, or as an alternative to any of the foregoing embodiments, further embodiments may include where the epicyclic gear set has a reduction ratio between 100:1 and 10,000:1.

In addition to one or more of the features described above, or as an alternative to any of the foregoing embodiments, further embodiments may include where the epicyclic gear set is integrated with the engine accessory.

In addition to one or more of the features described above, or as an alternative to any of the foregoing embodiments, further embodiments may include where the engine accessory is a pump or a starter.

In addition to one or more of the features described above, or as an alternative to any of the foregoing embodiments, further embodiments may include a delay circuit operable to delay activation of the bowed rotor prevention motor upon engine shutdown.

According to an embodiment, a gas turbine engine of an aircraft is provided. The gas turbine engine includes a starting spool coupled to an engine accessory gearbox, a gear set coupled through an engine accessory to the engine accessory gearbox, and a bowed rotor prevention system. The bowed rotor prevention system is operable to drive rotation of the starting spool through the gear set and the engine accessory gearbox upon engine shutdown.

In addition to one or more of the features described above, or as an alternative to any of the foregoing embodiments, further embodiments may include where the gear set is an epicyclic gear set, and the gear set includes an over-running clutch to prevent the bowed rotor prevention motor from being back-driven.

In addition to one or more of the features described above, or as an alternative to any of the foregoing embodiments, further embodiments may include where the gear set is integrated with the engine accessory, and the engine accessory is a pump or a starter.

According to an embodiment, a method for bowed rotor prevention for a gas turbine engine of an aircraft is provided. The method includes engaging a bowed rotor prevention motor with a starting spool of the gas turbine engine using a gear train coupled through an engine accessory to an engine accessory gearbox. The method also includes driving rotation of the starting spool by the bowed rotor prevention motor through the gear train upon engine shutdown.

In addition to one or more of the features described above, or as an alternative to any of the foregoing embodiments, further embodiments may include where the bowed rotor prevention motor is an electric motor and an energy storage source operable to drive the electric motor is a battery or a capacitor, and the method further includes recharging the energy storage source using a generator on an aircraft electrical system.

In addition to one or more of the features described above, or as an alternative to any of the foregoing embodiments, further embodiments may include driving rotation of the starting spool until a bowed rotor prevention shutdown request is detected, where the bowed rotor prevention shutdown request is detected based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

In addition to one or more of the features described above, or as an alternative to any of the foregoing embodiments, further embodiments may include delaying activation of the bowed rotor prevention motor upon engine shutdown through a delay circuit.

A technical effect of the apparatus, systems and methods is achieved by using a start sequence for a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
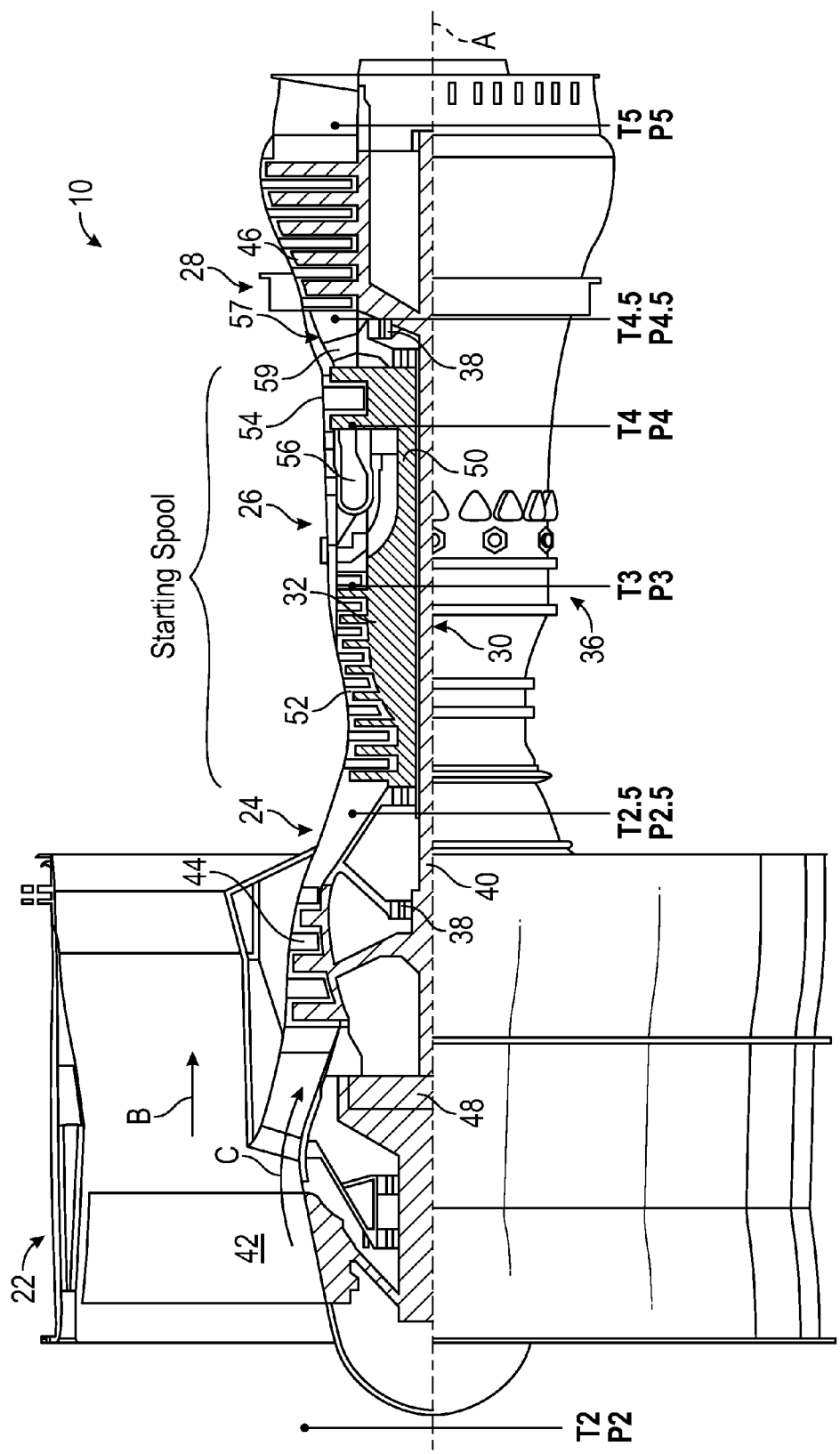
FIG. 1 is a cross-sectional view of a gas turbine engine.

Various embodiments of the present disclosure are related to a bowed rotor start prevention system in a gas turbine engine. Embodiments can include using an auxiliary drive system, which is also referred to as a rotisserie motoring system, that slowly rotates (e.g., <10 revolutions per minute) a starting spool of the engine to prevent or reduce a bowed rotor condition. On a start request prior to completing a rotisserie motoring time (e.g., an energy storage source is depleted) or if a failure of the rotisserie motoring system occurs, a starter valve of a starting system can be used to control a rotor speed of the starting spool of the gas turbine engine to mitigate a bowed rotor condition using a dry motoring process. During dry motoring, the starter valve can be actively adjusted to deliver air pressure from an air supply to an engine starting system that controls starting rotor speed. Dry motoring may be performed by running an engine starting system at a lower speed with a longer duration than typically used for engine starting while dynamically adjusting the starter valve to maintain the rotor speed and/or follow a dry motoring profile. Dry motoring is typically performed at a higher speed than rotisserie motoring. Some embodiments increase the rotor speed of the starting spool to approach a critical rotor speed gradually and as thermal distortion is decreased the starting spool then accelerates beyond the critical rotor speed to complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A dry motoring profile for dry motoring can be selected based on various parameters, such as a modeled temperature value or an actual temperature value of the gas turbine engine used to estimate heat stored in the engine core when a start sequence is initiated and identify a risk of a bowed rotor. The modeled temperature value alone or in combination with other values (e.g., measured temperatures) can be used to calculate a bowed rotor risk parameter. For example, the modeled temperature can be adjusted relative to an ambient temperature when calculating the bowed rotor risk parameter. The bowed rotor risk parameter may be used to take a control action to mitigate the risk of starting the gas turbine engine with a bowed rotor. The control action can include dry motoring consistent with the dry motoring profile. In some embodiments, a targeted rotor speed profile of the dry motoring profile can be adjusted as dry motoring is performed. As one example, if excessive vibration is detected as the rotor speed rises and approaches but remains well below the critical rotor speed, then the rate of rotor speed increases scheduled in the dry motoring profile can be reduced (i.e., a shallower slope) to extend the dry motoring time. Similarly, if vibration levels are observed below an expected minimum vibration level as the rotor speed increases, the dry motoring profile can be adjusted to a higher rate of rotor speed increases to reduce the dry motoring time.

A full authority digital engine control (FADEC) system or other system may send a message to the cockpit to inform the crew of an extended time start time due to bowed rotor mitigation actions prior to completing an engine start sequence. If the engine is in a ground test or in a test stand, a message can be sent to the test stand or cockpit based on the control-calculated risk of a bowed rotor. A test stand crew can be alerted regarding a requirement to keep the starting spool of the engine to a speed below the known resonance speed of the rotor in order to homogenize the temperature of the rotor and the casings about the rotor which also are distorted by temperature non-uniformity.

Monitoring of vibration signatures during the engine starting sequence can also or separately be used to assess the risk that a bowed rotor start has occurred due to some system malfunction and then direct maintenance, for instance, in the case of suspected outer air seal rub especially in the high compressor. Vibration data for the engine can also be monitored after bowed rotor prevention/mitigation is performed during an engine start sequence to confirm success of bowed rotor prevention/mitigation. If bowed rotor prevention/mitigation is unsuccessful or determined to be incomplete by the FADEC, resulting metrics (e.g., time, date, global positioning satellite (GPS) coordinates, vibration level vs. time, etc.) of the attempted bowed rotor prevention/mitigation can be recorded and/or transmitted to direct maintenance.

Referring now to FIG. 1, a schematic illustration of a gas turbine engine 10 is provided. The gas turbine engine 10 has among other components a fan through which ambient air is propelled into the engine housing, a compressor for pressurizing the air received from the fan and a combustor wherein the compressed air is mixed with fuel and ignited for generating combustion gases. The gas turbine engine 10 further comprises a turbine section for extracting energy from the combustion gases. Fuel is injected into the combustor of the gas turbine engine 10 for mixing with the compressed air from the compressor and ignition of the resultant mixture. The fan, compressor, combustor, and turbine are typically all concentric about a central longitudinal axis of the gas turbine engine 10. Thus, thermal deflection of the components of the gas turbine engine 10 may create the aforementioned bowing or "bowed rotor" condition along the common central longitudinal axis of the gas turbine engine 10 and thus it is desirable to clear or remove the bowed condition prior to the starting or restarting of the gas turbine engine 10.

FIG. 1 schematically illustrates a gas turbine engine 10 that can be used to power an aircraft, for example. The gas turbine engine 10 is disclosed herein as a multi-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment with two turbines and is sometimes referred to as a two spool engine, it should be understood that the concepts described herein are not limited to use with turbofans as the teachings may be applied to other types of turbine engines including three-spool architectures. In both of these architectures the starting spool is that spool that is located around the combustor, meaning the compressor part of the starting spool is flowing directly into the combustor and the combustor flows directly into the turbine section The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30 in the example of FIG. 1. The high speed spool 32 includes an outer shaft 50 that interconnects a high pressure compressor 52 and high pressure turbine 54. The high speed spool 32 is also referred to as a starting spool, as an engine starting system drives rotation of the high speed spool 32. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

A number of stations for temperature and pressure measurement/computation are defined with respect to the gas turbine engine 10 according to conventional nomenclature. Station 2 is at an inlet of low pressure compressor 44 having a temperature T2 and a pressure P2. Station 2.5 is at an exit of the low pressure compressor 44 having a temperature T2.5 and a pressure P2.5. Station 3 is at an inlet of the combustor 56 having a temperature T3 and a pressure P3. Station 4 is at an exit of the combustor 56 having a temperature T4 and a pressure P4. Station 4.5 is at an exit of the high pressure turbine 54 having a temperature T4.5 and a pressure P4.5. Station 5 is at an exit of the low pressure turbine 46 having a temperature T5 and a pressure P5. Temperatures in embodiments may be measured and/or modeled at one or more stations 2-5. Measured and/or modeled temperatures can be normalized to account for hot day/cold day differences. For instance, measured temperature T2 can be used as an ambient temperature and a modeled or measured temperature (e.g., T3) can be normalized by subtracting measured temperature T2.

Figure 10:
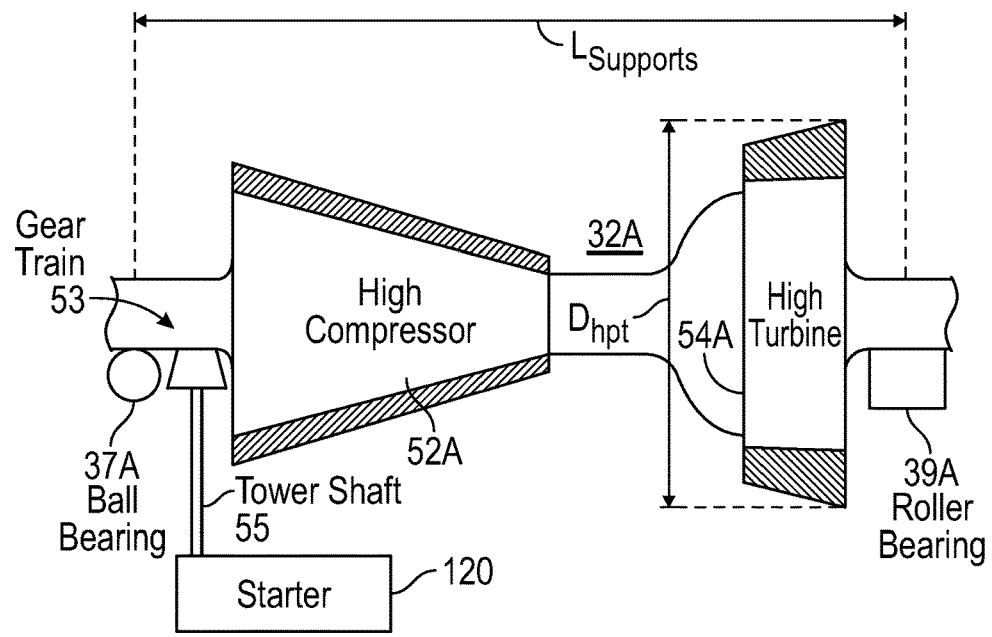
FIG. 10 is a schematic illustration of a high spool gas path with a straddle-mounted spool in accordance with an embodiment of the disclosure.
Figure 11:
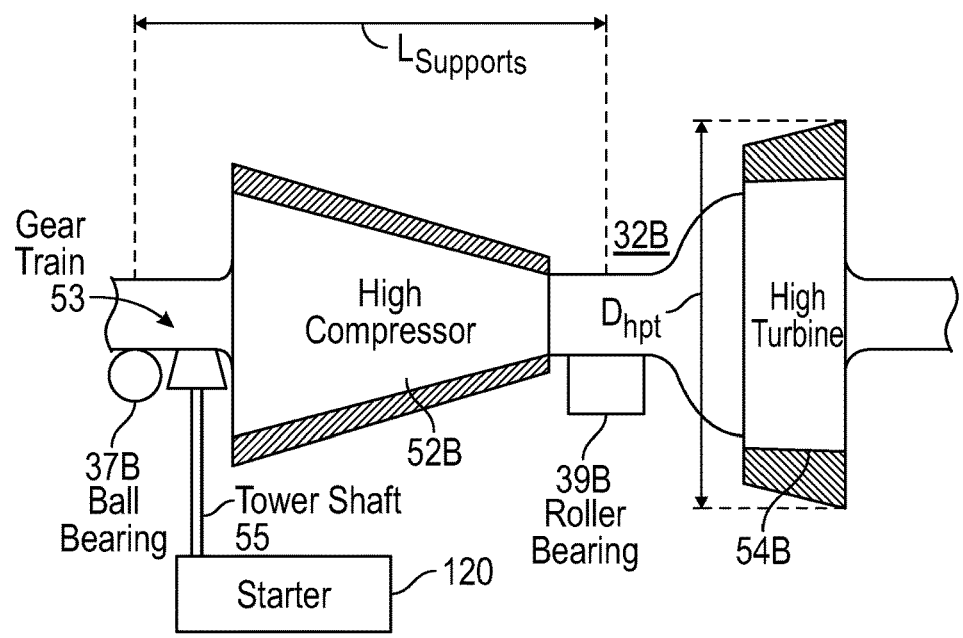
FIG. 11 is a schematic illustration of a high spool gas path with an overhung spool in accordance with an embodiment of the disclosure.

Although FIG. 1 depicts one example configuration, it will be understood that embodiments as described herein can cover a wide range of configurations. For example, embodiments may be implemented in a configuration that is described as a "straddle-mounted" spool 32A of FIG. 10. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 11. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the overhung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6. FIGS. 10 and 11 also illustrate a starter 120 interfacing through a gear train 53 via a tower shaft 55 with the straddle-mounted spool 32A proximate high compressor 52A and interfacing through gear train 53 via tower shaft 55 with the overhung mounted spool 32B proximate high compressor 52B as part of a starting system. FIGS. 10 and 11 further illustrate a bowed rotor prevention motor 152 that can provide an alternate source of torque to drive rotation of the tower shaft 55 to prevent or mitigate a bowed rotor condition as further described herein.

Figure 2:
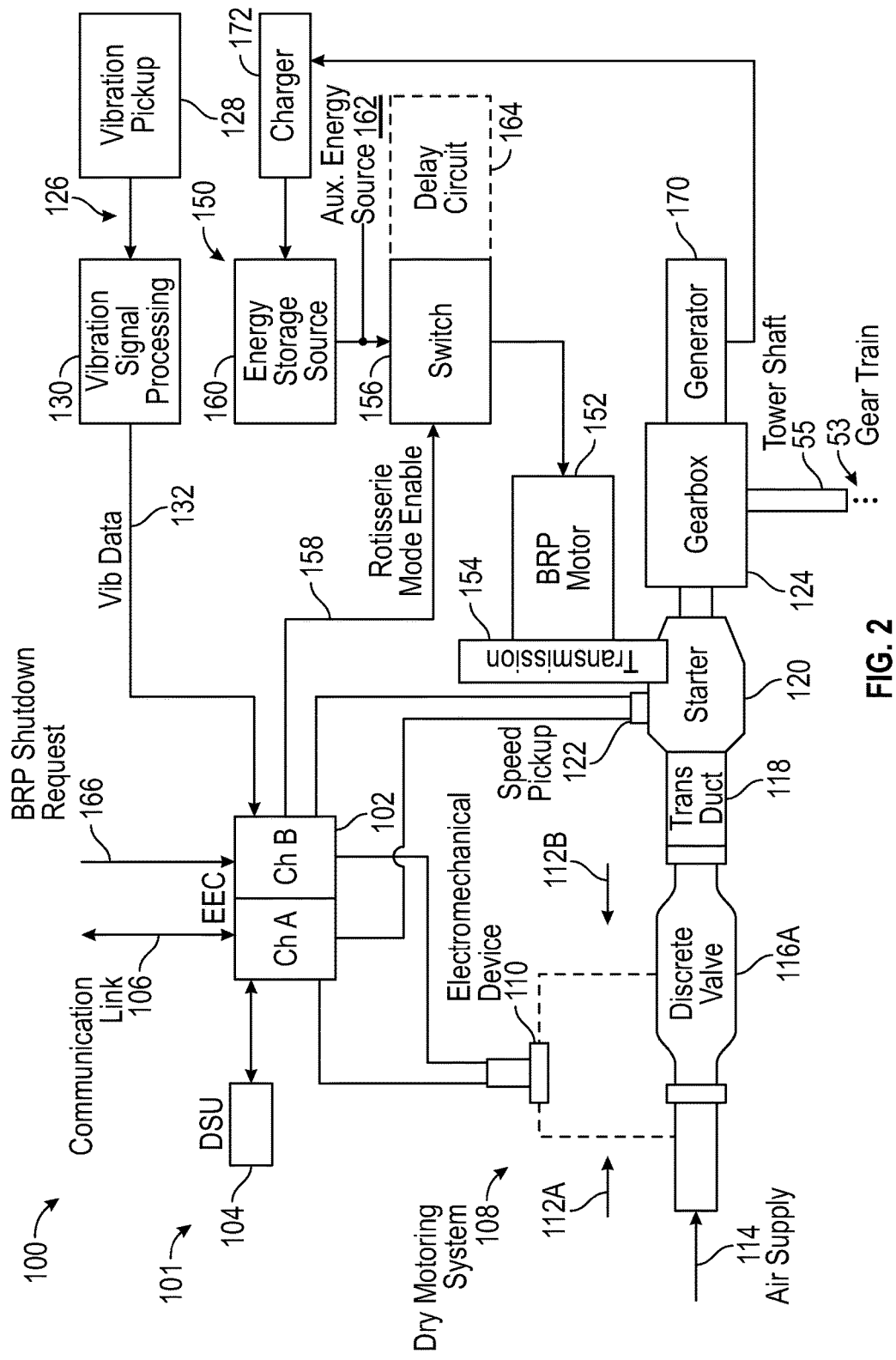
FIG. 2 is a schematic illustration of a starting system for a gas turbine engine in accordance with an embodiment of the disclosure.

Turning now to FIG. 2, a schematic of a starting system 100 for the gas turbine engine 10 of FIG. 1 is depicted according to an embodiment. The starting system 100 is also referred to generally as a gas turbine engine system. In the example of FIG. 2, the starting system 100 includes a controller 102 which may be an electronic engine control of an electronic engine control system, such as a dual-channel FADEC, and/or engine health monitoring unit. In an embodiment, the controller 102 may include memory to store instructions that are executed by one or more processors. The executable instructions may be stored or organized in any manner and at any level of abstraction, such as in connection with a controlling and/or monitoring operation of the engine 10 of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

The starting system 100 can also include a data storage unit (DSU) 104 that retains data between shutdowns of the gas turbine engine 10 of FIG. 1. The DSU 104 includes non-volatile memory and retains data between cycling of power to the controller 102 and DSU 104. A communication link 106 can include an aircraft and/or test stand communication bus to interface with aircraft controls, e.g., a cockpit, various onboard computer systems, and/or a test stand.

A dry motoring system 108 is operable to drive rotation of a starting spool (e.g., high speed spool 32) of the gas turbine engine 10 of FIG. 1. Either or both channels of controller 102 can alternate on and off commands to an electromechanical device 110 coupled to a discrete starter valve 116A to achieve a partially open position of the discrete starter valve 116A to control a flow from a starter air supply 114 (also referred to as air supply 114) through a transfer duct 118 to an air turbine starter 120 (also referred to as starter 120 or pneumatic starter motor 120) to drive rotation of a starting spool of the gas turbine engine 10 below an engine idle speed. The air supply 114 (also referred to as starter air supply 114) can be provided by any known source of compressed air, such as an auxiliary power unit or ground cart.

The controller 102 can monitor a speed sensor, such as speed pickup 122 that may sense the speed of the engine rotor through its connection to a gearbox 124 which is in turn connected to the high speed spool 32 via tower shaft 55 through gear train 53 (e.g., rotational speed of high speed spool 32) or any other such sensor for detecting or determining the speed of the gas turbine engine 10 of FIG. 1. The starter 120 may be coupled to the gearbox 124 of the gas turbine engine 10 of FIG. 1 directly or through a transmission such as a clutch system (not depicted). The controller 102 can establish a control loop with respect to rotor speed to adjust positioning of the discrete starter valve 116A.

The discrete starter valve 116A is an embodiment of a starter valve that is designed as an on/off valve which is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The controller 102 can modulate the on and off commands (e.g., as a duty cycle using pulse width modulation) to the electromechanical device 110 to further open the discrete starter valve 116A and increase a rotational speed of the starting spool of the gas turbine engine 10 of FIG. 1. In an embodiment, the electromechanical device 110 has a cycle time defined between an off-command to an on-command to the off-command that is at most half of a movement time for the discrete starter valve 116A to transition from fully closed to fully open. Pneumatic lines 112A and 112B or a mechanical linkage (not depicted) can be used to drive the discrete starter valve 116A between the open position and the closed position. The electromechanical device 110 can be a solenoid that positions the discrete starter valve 116A based on intermittently supplied electric power as commanded by the controller 102. In an alternate embodiment, the electromechanical device 110 is an electric valve controlling muscle air to adjust the position of the discrete starter valve 116A as commanded by the controller 102.

The starting system 100 also include a rotisserie motoring system 150 (also referred to as an auxiliary drive system) that includes a bowed rotor prevention motor 152 that is operable to drive rotation of the starting spool (e.g., high speed spool 32) of the gas turbine engine 10 of FIG. 1 through gearbox 124. A transmission 154 for reduction gearing and/or a clutch may be interposed between the bowed rotor prevention motor 152 and the gearbox 124 through an engine accessory such as the starter 120. The transmission 154 can be coupled to or integrally formed with an engine accessory, such as the starter 120 or a pump (e.g., engine accessory 157 of FIG. 3), coupled to the gearbox 124. The rotisserie motoring system 150 also includes a switch 156 that may be commanded by either or both channels of the controller 102 (e.g., using a rotisserie mode enable 158) to selectively provide electrical power to the bowed rotor prevention motor 152. According to various embodiments, the switch 156 may be a mechanical switch, electrical relay, or other mechanism for controlling the distribution of electrical power to the rotisserie motoring system 150. Electrical power may be provided from an energy storage source 160 and/or an auxiliary energy source 162, such as ground power or other aircraft/external source. The energy storage source 160 can be a battery or capacitor of an aircraft electrical system, which may be charged by a generator 170 through a charger 172. The generator 170 may be driven by the gearbox 124 (e.g., during operation of the gas turbine engine 10) or other source of rotational energy on the aircraft. Examples of the generator 170 include a permanent magnet alternator/generator, an integrated drive generator, a variable frequency generator, and other generator technologies known in the art. The rotisserie motoring system 150 can also include a delay circuit 164 that may be integrated with the switch 156 (e.g., a capacitive circuit) or located elsewhere as part of the rotisserie motoring system 150. For instance, the delay circuit 164 may be implemented as a physical or logical function within the controller 102.

In various embodiments, the rotisserie motoring system 150 or the dry motoring system 108 can be used to prevent/mitigate a bowed rotor condition depending on the present operating characteristics of the gas turbine engine 10 of FIG. 1. The controller 102 in combination with the dry motoring system 108 and the rotisserie motoring system 150 may be collectively referred to as a bowed rotor prevention system 101 that is operable to prevent and/or mitigate a bowed rotor condition of the gas turbine engine 10 of FIG. 1. In an embodiment, the controller 102 is operable to engage the bowed rotor prevention motor 152 and drive rotation of the starting spool of the gas turbine engine 10 of FIG. 1 below a critical rotor speed until a bowed rotor prevention threshold condition is met or a bowed rotor prevention shutdown request 166 to halt rotation of the starting spool is received. Various methods of determining an appropriate amount of motoring time by the rotisserie motoring system 150 or the dry motoring system 108 are further described herein to establish the bowed rotor prevention threshold condition and whether the bowed rotor prevention threshold condition is met. The bowed rotor prevention shutdown request 166 may be received as a discrete signal or encoded on the communication link 106. The bowed rotor prevention shutdown request 166 can be detected based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10 of FIG. 1.

In the example of FIG. 2, the engine also includes a vibration monitoring system 126. The vibration monitoring system 126 includes at least one vibration pickup 128, e.g., an accelerometer, operable to monitor vibration of the gas turbine engine 10 of FIG. 1. Vibration signal processing 130 can be performed locally with respect to the vibration pickup 128, within the controller 102, or through a separate vibration processing system, which may be part of an engine health monitoring system to acquire vibration data 132. Alternatively, the vibration monitoring system 126 can be omitted in some embodiments.

Figure 3:
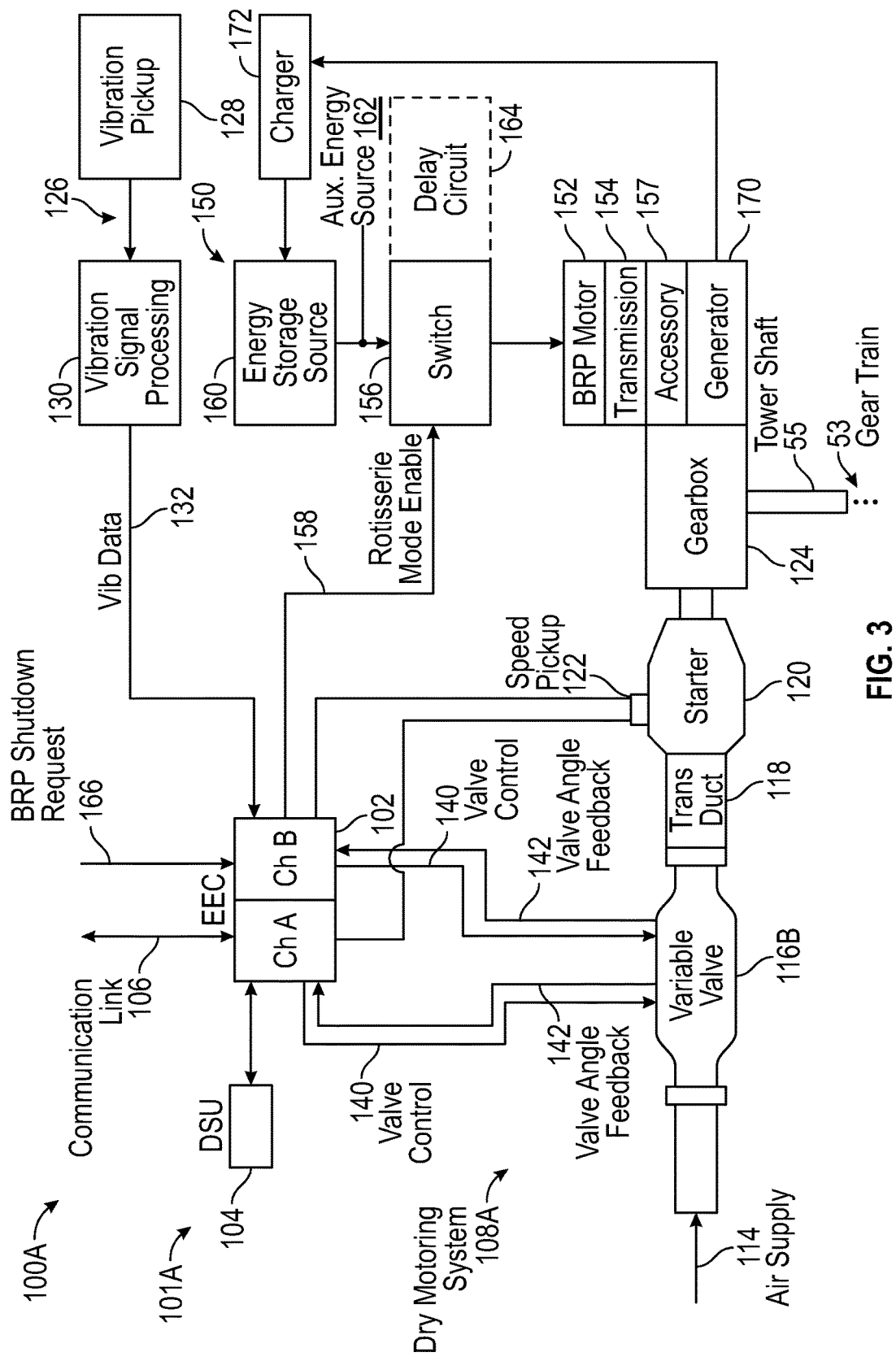
FIG. 3 is a schematic illustration of a starting system for a gas turbine engine in accordance with another embodiment of the disclosure.

Similar to FIG. 2, FIG. 3 is a schematic illustration of a starting system 100A for the gas turbine engine 10 of FIG. 1 in accordance with another embodiment. The starting system 100A includes controller 102 that controls dry motoring system 108A, as an alternate embodiment of the dry motoring system 108 of FIG. 2. Rather than using an electromechanical device 110 coupled to a discrete starter valve 116A to achieve a partially open position of the discrete starter valve 116A of FIG. 2, the dry motoring system 108A of FIG. 3 uses a variable position starter valve 116B. In FIG. 3, either or both channels of controller 102 can output a valve control signal 140 operable to dynamically adjust a valve angle of the variable position starter valve 116B that selectively allows a portion of the air supply 114 to pass through the variable position starter valve 116B and transfer duct 118 to air turbine starter 120. The variable position starter valve 116B is a continuous/infinitely adjustable valve that can hold a commanded valve angle, which may be expressed in terms of a percentage open/closed and/or an angular value (e.g., degrees or radians). Performance parameters of the variable position starter valve 116B can be selected to meet dynamic response requirements of the starting system 100A. For example, in some embodiments, the variable position starter valve 116B has a response rate of 0% to 100% open in less than 40 seconds. In other embodiments, the variable position starter valve 116B has a response rate of 0% to 100% open in less than 30 seconds. In further embodiments, the variable position starter valve 116B has a response rate of 0% to 100% open in less than 20 seconds.

The controller 102 can monitor a valve angle of the variable position starter valve 116B using valve angle feedback signals 142 provided to both channels of controller 102. As one example, in an active/standby configuration, both channels of the controller 102 can use the valve angle feedback signals 142 to track a current valve angle, while only one channel designated as an active channel outputs valve control signal 140. Upon a failure of the active channel, the standby channel of controller 102 can take over as the active channel to output valve control signal 140. In an alternate embodiment, both channels of controller 102 output all or a portion of a valve angle command simultaneously on the valve control signals 140. The controller 102 can establish an outer control loop with respect to rotor speed and an inner control loop with respect to the valve angle of the variable position starter valve 116B.

The starting system 100A also includes the rotisserie motoring system 150 as previously described with respect to FIG. 2. Accordingly, the rotisserie motoring system 150 or the dry motoring system 108A can be used to prevent/mitigate a bowed rotor condition depending on the present operating characteristics of the gas turbine engine 10 of FIG. 1. Similar to FIG. 2, the controller 102 in combination with the dry motoring system 108A and the rotisserie motoring system 150 may be collectively referred to as a bowed rotor prevention system 101A that is operable to prevent and/or mitigate a bowed rotor condition of the gas turbine engine 10 of FIG. 1. FIG. 3 depicts an example of coupling the transmission 154 through engine accessory 157 that is coupled to gearbox 124, where the engine accessory 157 is any accessory that is typically driven by the gearbox 124. A drive portion of the engine accessory 157 is driven by rotation of the bowed rotor prevention motor 152 and the rotational energy is translated to the gearbox 124 and tower shaft 55 through gear train 53 to a starting spool of the gas turbine engine 10 of FIG. 1. The transmission 154 may prevent the bowed rotor prevention motor 152 from being back-driven by rotation of the engine accessory 157 under normal operating conditions.

As in the example of FIG. 2, the starting system 100A of FIG. 3 also includes vibration monitoring system 126. The vibration monitoring system 126 includes at least one vibration pickup 128, e.g., an accelerometer, operable to monitor vibration of the gas turbine engine 10 of FIG. 1. Vibration signal processing 130 can be performed locally with respect to the vibration pickup 128, within the controller 102, or through a separate vibration processing system, which may be part of an engine health monitoring system to acquire vibration data 132. Alternatively, the vibration monitoring system 126 can be omitted in some embodiments.

Figure 14:
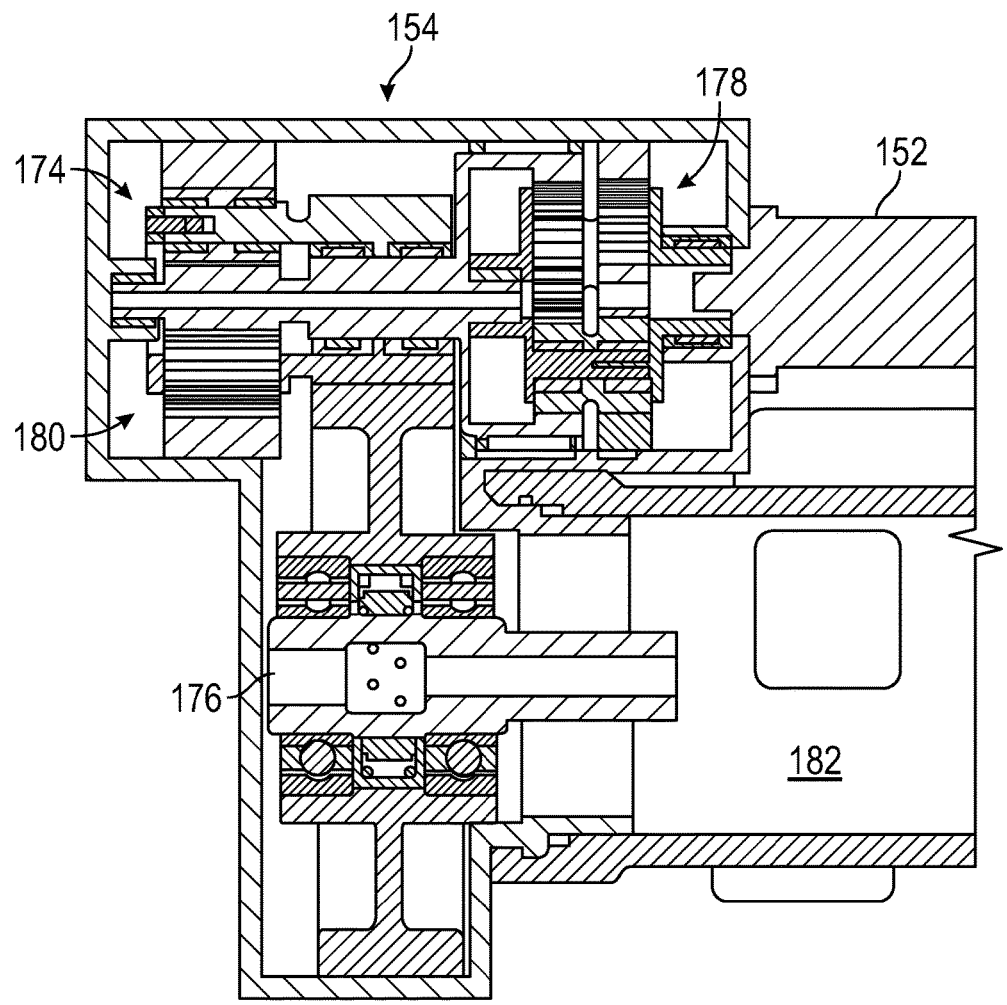
FIG. 14 is a schematic illustration of a transmission in accordance with an embodiment of the disclosure.

An embodiment of the transmission 154 of FIGS. 2 and 3 is depicted in greater detail in FIG. 14. The transmission 154 may be considered part of the gear train 53 and includes a gear set 174, which may be an epicyclic gear set coupled to the engine accessory gearbox 124 of the gas turbine engine 10 of FIG. 1. The gear set 174 may include a back-drive preventer 176 that isolates the bowed rotor prevention motor 152 from rotatable components of the gas turbine engine 10 to inhibit the bowed rotor prevention motor 152 from being back-driven. The back-drive preventer 176 can be a clutch, such as an over-running clutch, with a spur gear mesh. The gear set 174 can also include a dual-stage planet system 178 and a planet 180.

Figure 15:
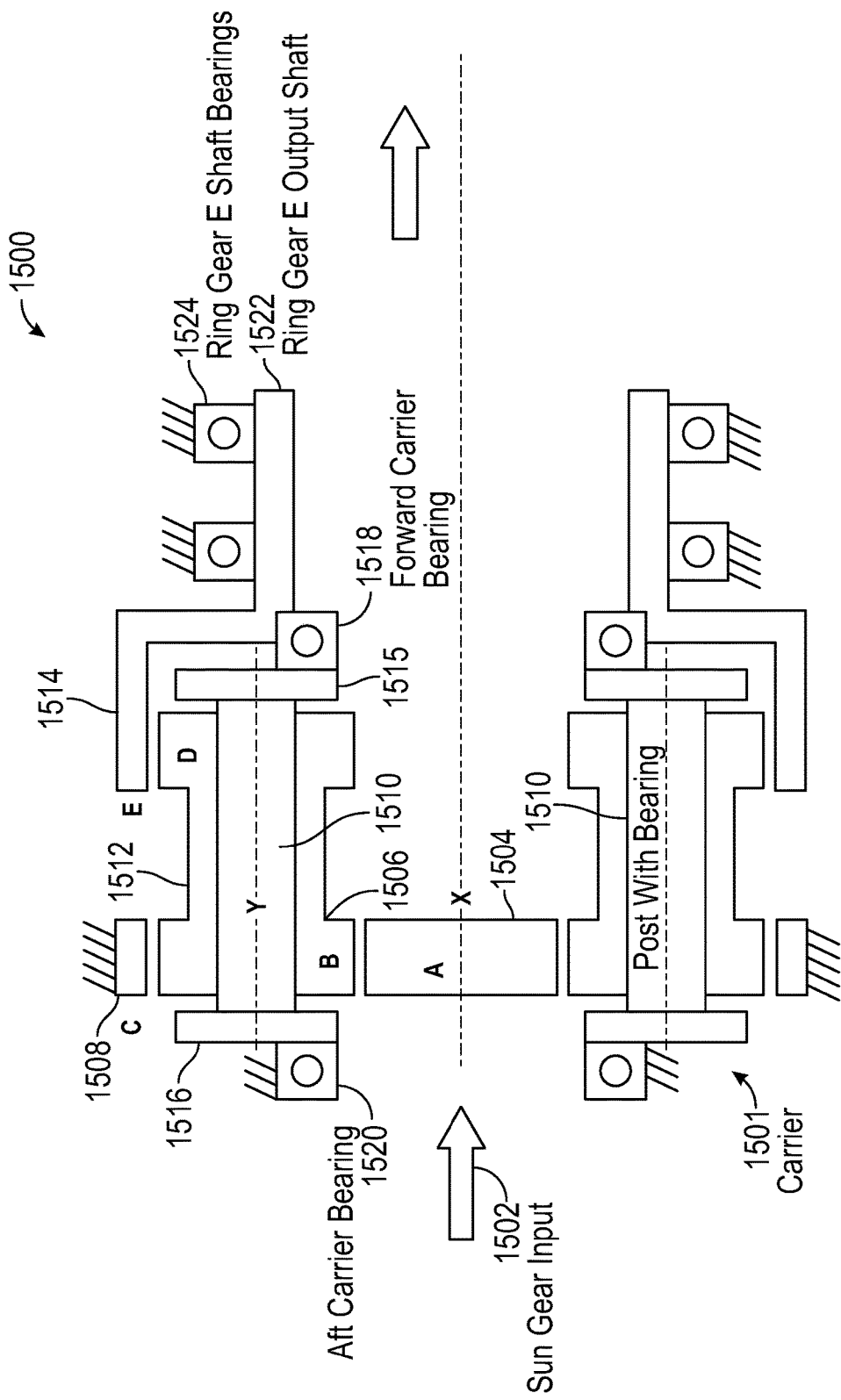
FIG. 15 is a schematic illustration of a gear set of a transmission in accordance with an embodiment of the disclosure.
Figure 16:
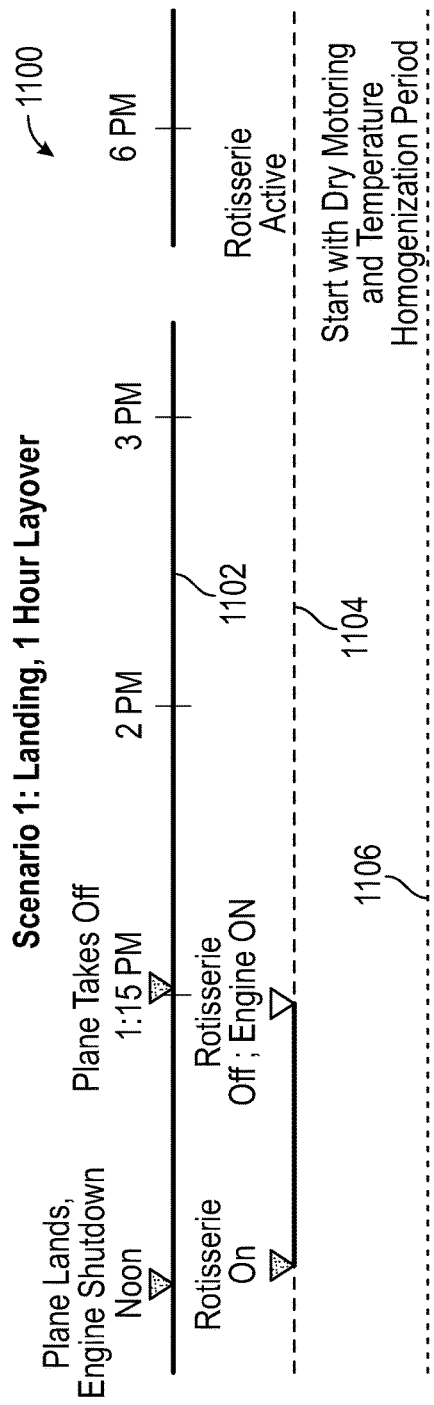
FIG. 16 depicts a first scenario example of bowed rotor prevention in accordance with an embodiment of the disclosure.
Figure 17:
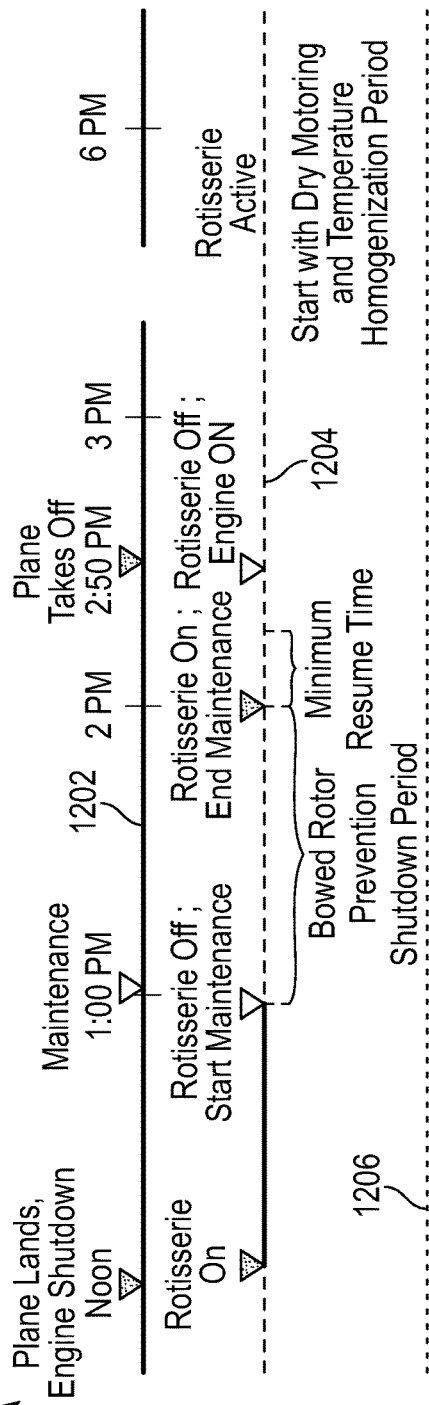
FIG. 17 depicts a second scenario example of bowed rotor prevention in accordance with an embodiment of the disclosure.

When the gear set 174 is implemented as an epicyclic gear set as depicted in the examples of FIGS. 14 and 15, a compact design can be achieved with a relatively high reduction ratio, for instance, a reduction ratio between 100:1 and 10,000:1. In some embodiments, an 860:1 dual stage planet system 178 results in an overall reduction ratio of about 2,500:1 at a drive portion 182 of an engine accessory such as starter 120 of FIG. 2 or engine accessory 157 of FIG. 3. Thus, 1 inch-pound at the bowed rotor prevention motor 152 would equal 2,500 inch-pounds at the drive portion 182, which enables the bowed rotor prevention motor 152 to be a small, low-power motor, e.g., about 0.05 horsepower at 1800 revolutions-per-minute or less to turn the starting spool of the gas turbine engine 10 at about 1 revolution per minute. Further reduction can be provided by planet 180, for instance, an additional 4:1 reduction.

When the gear set 174 is implemented as an epicyclic gear set as depicted in gear system 1500 of FIG. 15, input torque 1502 from the bowed rotor prevention motor 152 turns sun gear A 1504, sun gear A 1504 meshes with intermediate gear B 1506, which meshes with ring gear C 1508 fixed to ground. Sun gear A 1504 rotates about axis X. Intermediate gear B 1506 is on a common shaft with intermediate gear D 1512. Both gears 1506, 1512 rotate about axis Y. Intermediate gear D 1512 meshes with rotating ring gear E 1514. Ring gear E 1514 also rotates about axis X. Intermediate gears B 1506 and D 1512 are mounted on a bearing post 1510 that is connected to fore and aft carrier plates 1515, 1516. The entire carrier assembly 1501 including bearing posts 1510 and gears B 1506 and D 1512 rotate about axis X through fore and aft bearings 1518, 1520. The aft bearing 1520 is fixed to ground and the forward bearing 1518 is mounted between carrier assembly 1501 and ring gear E output shaft 1522. Ring gear E output shaft 1522 rotates about axis X on ring gear E shaft bearings 1524. The reduction ratio for gear system 1500 is given by the following equation where A, B, C are tooth numbers or diameters of the respective gears. A reduction ratio can be computed as $(1+C/A)/(1-(C/B)*(D/E))$.

Figure 4:
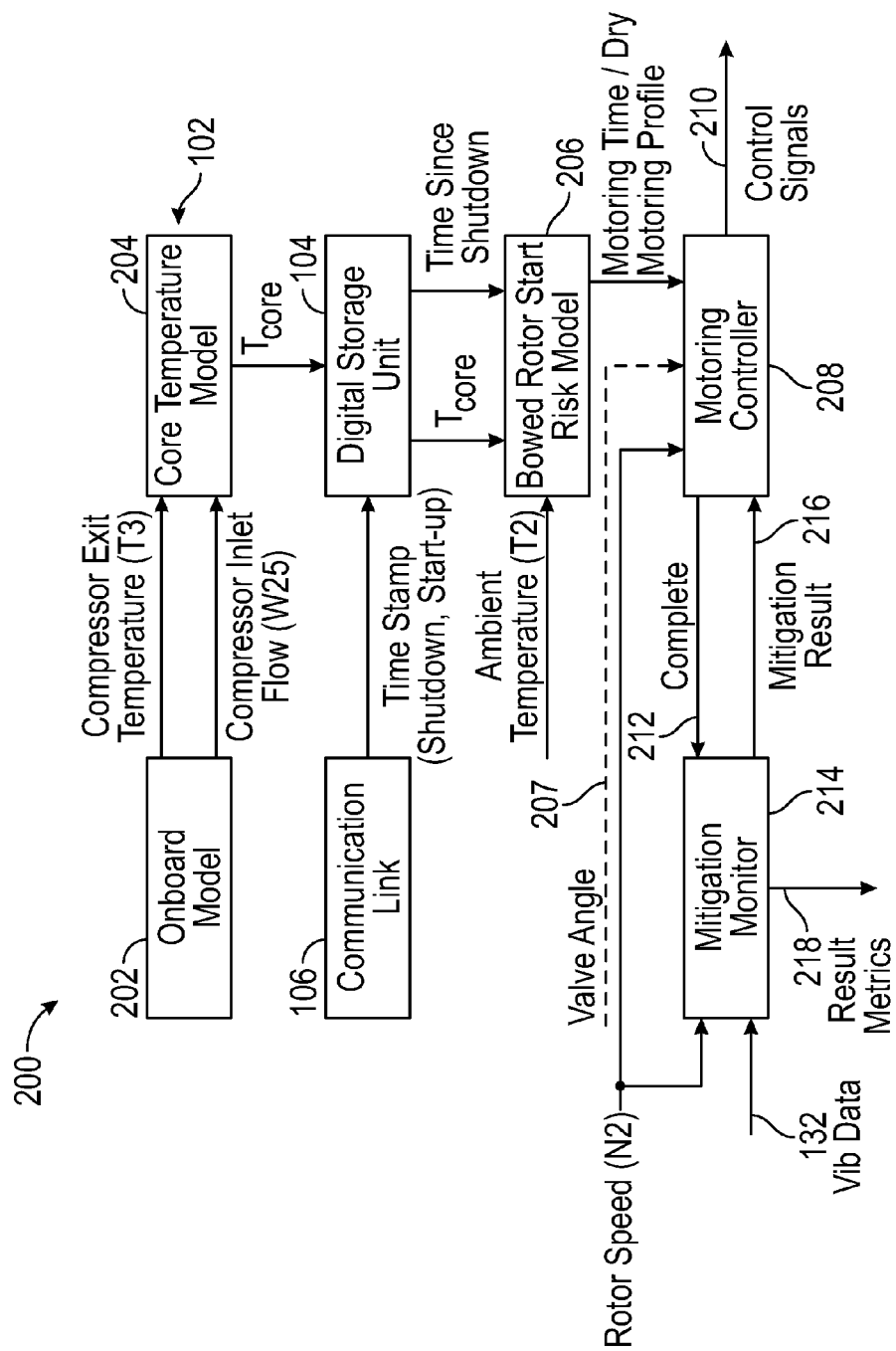
FIG. 4 is a block diagram of a system for bowed rotor start prevention in accordance with an embodiment of the disclosure.

Returning to FIG. 4, a block diagram of a system 200 for bowed rotor start prevention is depicted that may control the bowed rotor prevention motor 152 as well as the discrete starter valve 116A of FIG. 2 or the variable position starter valve 116B of FIG. 3 via control signals 210 in accordance with an embodiment. The system 200 may be implemented in the bowed rotor start prevention system 101 or 101A of FIGS. 2 and 3. In the example of FIG. 4, the system 200 includes an onboard model 202 operable to produce a compressor exit temperature $T_3$ and a compressor inlet flow $W_{25}$ for use by a core temperature model 204. The onboard model 202 is configured to synthesize or predict major temperatures and pressures throughout the gas turbine engine 10 of FIG. 1 beyond those sensed by sensors positioned about the gas turbine engine 10. The onboard model 202 and core temperature model 204 are examples of a first thermal model and a second thermal model that may be separately implemented or combined as part of controller 102 and resident upon an electronic engine control system of the gas turbine engine 10 of FIG. 1.

Engine parameter synthesis is performed by the onboard model 202, and the engine parameter synthesis may be performed using the technologies described in U.S. Patent Publication No. 2011/0077783, the entire contents of which are incorporated herein by reference thereto. Of the many parameters synthesized by onboard model 202 at least two are outputted to the core temperature model 204, $T_3$, which is the compressor exit gas temperature of the engine 10 and $W_{25}$, which is the air flow through the compressor. Each of these values are synthesized by onboard model 202 and inputted into the core temperature model 204 that synthesizes or provides a heat state ($T_{core}$) of the gas turbine engine 10. $T_{core}$ can be determined by a first order lag or function of $T_3$ and a numerical value X (e.g., $f(T_3, X)$), wherein X is a value determined from a lookup table stored in memory of controller 102. Accordingly, X is dependent upon the synthesized value of $W_{25}$. In other words, $W_{25}$ when compared to a lookup table of the core temperature model 204 will determine a value X to be used in determining the heat state or $T_{core}$ of the engine 10. In one embodiment, the higher the value of $W_{25}$ or the higher the flow rate through the compressor the lower the value of X.

The heat state of the engine 10 during use or $T_{core}$ is determined or synthesized by the core temperature model 204 as the engine 10 is being run. In addition, $T_3$ and $W_{25}$ are determined or synthesized by the onboard model 202 and/or the controller 102 as the engine 10 is being operated.

At engine shutdown, the current or most recently determined heat state of the engine or $T_{core\ shutdown}$ of the engine 10 is recorded into DSU 104, and the time of the engine shutdown $t_{shutdown}$ is recorded into the DSU 104. Time values and other parameters may be received on communication link 106. As long as electrical power is present for the controller 102 and DSU 104, additional values of temperature data may be monitored for comparison with modeled temperature data to validate one or more temperature models (e.g., onboard model 202 and/or core temperature model 204) of the gas turbine engine 10.

During an engine start sequence or restart sequence, a bowed rotor start risk model 206 (also referred to as risk model 206) of the controller 102 is provided with the data stored in the DSU 104, namely $T_{core\ shutdown}$ and the time of the engine shutdown $t_{shutdown}$. In addition, the bowed rotor start risk model 206 is also provided with the time of engine start $t_{start}$ and the ambient temperature of the air provided to the inlet of the engine 10 $T_{inlet}$ or $T_2$. $T_2$ is a sensed value as opposed to the synthesized value of $T_3$.

The bowed rotor start risk model 206 maps core temperature model data with time data and ambient temperature data to establish a motoring time $t_{motoring}$ as an estimated period of motoring to mitigate a bowed rotor of the gas turbine engine 10. The motoring time $t_{motoring}$ is indicative of a bowed rotor risk parameter computed by the bowed rotor start risk model 206. For example, a higher risk of a bowed rotor may result in a longer duration of dry motoring to reduce a temperature gradient prior to starting the gas turbine engine 10 of FIG. 1. As will be discussed herein and in one embodiment, an engine start sequence may automatically include a modified start sequence; however, the duration of the modified start sequence prior to a normal start sequence will vary based upon the time period $t_{motoring}$ that is calculated by the bowed rotor start risk model 206. The motoring time $t_{motoring}$ for predetermined target speed $N_{target}$ of the engine 10 is calculated as a function of $T_{core\ shutdown}$, $t_{shutdown}$, $t_{start}$ and $T_2$, (e.g., f ($T_{core\ shutdown}$, $t_{shutdown}$, $t_{start}$ and $T_2$), while a target speed $N_{target}$ is a predetermined speed that can be fixed or vary within a predetermined speed range of $N_{targetMin}$ to $N_{targetMax}$. In other words, the target speed $N_{target}$ may be the same regardless of the calculated time period $t_{motoring}$ or may vary within the predetermined speed range of $N_{targetMin}$ to $N_{targetMax}$. The target speed $N_{target}$ may also be referred to as a dry motoring mode speed.

Based upon these values ($T_{core\ shutdown}$, $t_{shutdown}$, $t_{start}$ and $T_2$) the motoring time $t_{motoring}$ at a predetermined target speed $N_{target}$ for the modified start sequence of the engine 10 is determined by the bowed rotor start risk model 206. Based upon the calculated time period $t_{motoring}$ which is calculated as a time to run the engine 10 at a predetermined target speed $N_{target}$ in order to clear a "bowed condition". In accordance with an embodiment of the disclosure, the controller 102 can run through a modified start sequence upon a start command given to the engine 10 by an operator of the engine 10 such as a pilot of an airplane the engine is used with. It is understood that the motoring time $t_{motoring}$ of the modified start sequence may be in a range of 0 seconds to minutes, which depends on the values of $T_{core\ shutdown}$, $t_{shutdown}$, $t_{start}$ and $T_2$.

In an alternate embodiment, the modified start sequence may only be run when the bowed rotor start risk model 206 has determined that the motoring time $t_{motoring}$ is greater than zero seconds upon receipt of a start command given to the engine 10. In this embodiment and if the bowed rotor start risk model 206 has determined that $t_{motoring}$ is not greater than zero seconds, a normal start sequence will be initiated upon receipt of a start command to the engine 10.

Accordingly and during an engine command start, the bowed rotor start risk model 206 of the system 200 may be referenced wherein the bowed rotor start risk model 206 correlates the elapsed time since the last engine shutdown time and the shutdown heat state of the engine 10 as well as the current start time $t_{start}$ and the inlet air temperature $T_2$ in order to determine the duration of the modified start sequence wherein motoring of the engine 10 at a reduced speed $N_{target}$ without fuel and ignition is required. As used herein, motoring of the engine 10 in a modified start sequence refers to the turning of a starting spool by the starter 120 at a reduced speed $N_{target}$ without introduction of fuel and an ignition source in order to cool the engine 10 to a point wherein a normal start sequence can be implemented without starting the engine 10 in a bowed rotor state. In other words, cool or ambient air is drawn into the engine 10 while motoring the engine 10 at a reduced speed in order to clear the "bowed rotor" condition, which is referred to as a dry motoring mode.

The bowed rotor start risk model 206 can output the motoring time $t_{motoring}$ to a motoring controller 208. The motoring controller 208 uses a dynamic control calculation in order to determine a required valve position of the starter valve 116A, 116B used to supply an air supply or starter air supply 114 to the engine 10 in order to limit the motoring speed of the engine 10 to the target speed $N_{target}$ due to the position of the starter valve 116A, 116B. The required valve position of the starter valve 116A, 116B can be determined based upon an air supply pressure as well as other factors including but not limited to ambient air temperature, parasitic drag on the engine 10 from a variety of engine driven components such as electric generators and hydraulic pumps, and other variables such that the motoring controller 208 closes the loop for an engine motoring speed target $N_{target}$ for the required amount of time based on the output of the bowed rotor start risk model 206. In one embodiment, the dynamic control of the valve position (e.g., open state of the valve (e.g., fully open, ½ open, ¼ open, etc.) in order to limit the motoring speed of the engine 10) is controlled via duty cycle control (on/off timing using pulse width modulation) of electromechanical device 110 for discrete starter valve 116A.

When the variable position starter valve 116B of FIG. 3 is used, a valve angle 207 can be provided to motoring control 208 based on the valve angle feedback 142 of FIG. 3. A rotor speed N2 (i.e., speed of high speed spool 32) can be provided to the motoring controller 208 and a mitigation monitor 214, where motoring controller 208 and a mitigation monitor 214 may be part of controller 102. Vibration data 132 can also be provided to mitigation monitor 214.

The risk model 206 can determine a bowed rotor risk parameter that is based on the heat stored ($T_{core}$) using a mapping function or lookup table. When not implemented as a fixed rotor speed, the bowed rotor risk parameter can have an associated dry motoring profile defining a target rotor speed profile over an anticipated amount of time for the motoring controller 208 to send control signals 210, such as valve control signals 140 for controlling variable position starter valve 116B of FIG. 3.

In some embodiments, the motoring controller 208 defaults to using the rotisserie motoring system 150 for bowed rotor prevention and only commands dry motoring using the dry motoring system 108 or 108A if a sufficient bowed rotor risk still remains on an engine start command. For example, an initial bowed rotor risk determination may establish a needed motoring time for the rotisserie motoring system 150. If an insufficient amount of time elapses with the rotisserie motoring system 150 active (e.g., due to maintenance actions), the motoring controller 208 may use the earlier calculated dry motoring parameters or compute a new set of dry motoring parameters to determine a dry motoring time and/or dry motoring profile for the dry motoring system 108 or 108A.

Figure 7:
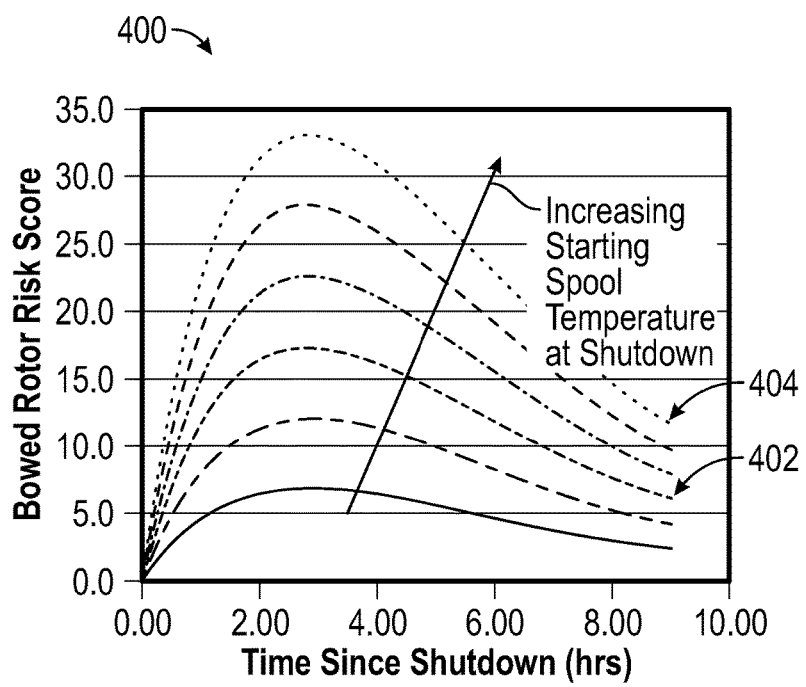
FIG. 7 is a graph illustrating a bowed rotor risk score with respect to time in accordance with an embodiment of the disclosure.

The bowed rotor risk parameter may be quantified according to a profile curve 402 selected from a family of curves 404 that align with observed aircraft/engine conditions that impact turbine bore temperature and the resulting bowed rotor risk as depicted in the example graph 400 of FIG. 7.

In some embodiments, an anticipated amount of dry motoring time can be used to determine a target rotor speed profile in a dry motoring profile for the currently observed conditions. As one example, one or more baseline characteristic curves for the target rotor speed profile can be defined in tables or according to functions that may be rescaled to align with the observed conditions. An example of a target rotor speed profile 1002 is depicted in graph 1000 of FIG. 13 that includes a steep initial transition portion 1004, followed by a gradually increasing portion 1006, and a late acceleration portion 1008 that increases rotor speed above a critical rotor speed, through a fuel-on speed and an engine idle speed. The target rotor speed profile 1002 can be rescaled with respect to time and/or select portions (e.g., portions 1004, 1006, 1008) of the target rotor speed profile 1002 can be individually or collectively rescaled (e.g., slope changes) with respect to time to extend or reduce the total motoring time. The target rotor speed profile 1002 may include all positive slope values such that the actual rotor speed 1010 is driven to essentially increase continuously while bowed rotor start prevention is active. While the example of FIG. 13 depicts one example of the target rotor speed profile 1002 that can be defined in a dry motoring profile, it will be understood that many variations are possible in embodiments.

Figure 8:
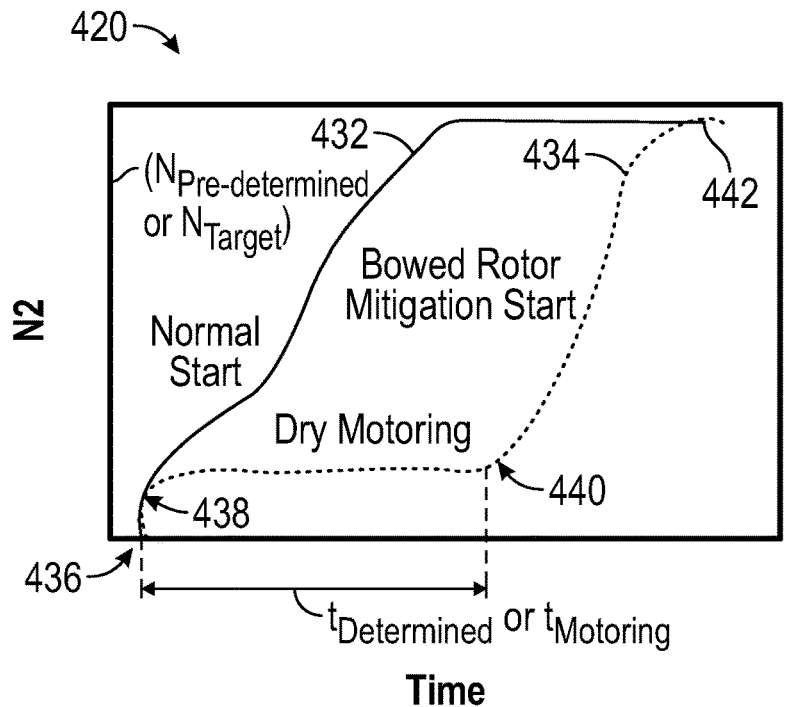
FIG. 8 is a graph illustrating a normal or cooled engine start versus a modified engine start in accordance with an embodiment of the disclosure.

An example of the effects of bowed rotor mitigation are illustrated in graph 420 of FIG. 8 that depicts a normal or cooled engine start (line 432) versus a bowed rotor or mitigated engine start (line 434) in accordance with one non-limiting embodiment of the disclosure. At point 436, a pilot or operator of the engine 10 sets or initiates a start command of the engine. At point 438 and after the start command is initiated, the controller 102, based upon the risk model 206, requires the engine to motor at a pre-determined speed ($N_{pre-determined}$ or $N_{target}$), which is less than a normal idle start speed N2 for a time ($t_{determined}$). The pre-determined speed ($N_{pre-determined}$ or $N_{target}$) can be defined within a predetermined speed range $N_{targetMin}$ to $N_{targetMax}$ that is used regardless of the calculated time period $t_{motoring}$ for homogenizing engine temperatures. The time period $t_{determined}$ is based upon the output of the risk model 206. The determined speed ($N_{pre-determined}$ or $N_{target}$) is achieved by controlling the operational position of starter valve 116A, 116B. Thereafter and at point 440 when the required motoring time (determined from the risk model 206) has been achieved, such that the "bowed condition" has been cleared a normal start sequence with a normal speed N2 is initiated. Subsequently and at point 442, the idle speed N2 has been achieved. This modified sequence is illustrated in one non-limiting manner by the dashed line 434 of the graph 420 of FIG. 8. It is, of course, understood that ($t_{determined}$) may vary depending upon the outputs of the risk model 206, while $N_{pre-determined}$ or $N_{target}$ is a known value. Of course, in alternative embodiments, the risk model 206 may be configured to provide the speed of the engine 10 during a modified start sequence. Still further and as mentioned above, the starter valve may be dynamically varied based upon the outputs of the risk model 206 as well as the pressure of the air supply 114 in order to limit the motoring speed of the engine 10 to that of $N_{pre-determined}$ or $N_{target}$ during the clearing of a bowed rotor condition. Line 432 illustrates a normal start sequence wherein the time $t_{determined}$ is zero for a modified start as determined by the risk model 206.

Figure 12:
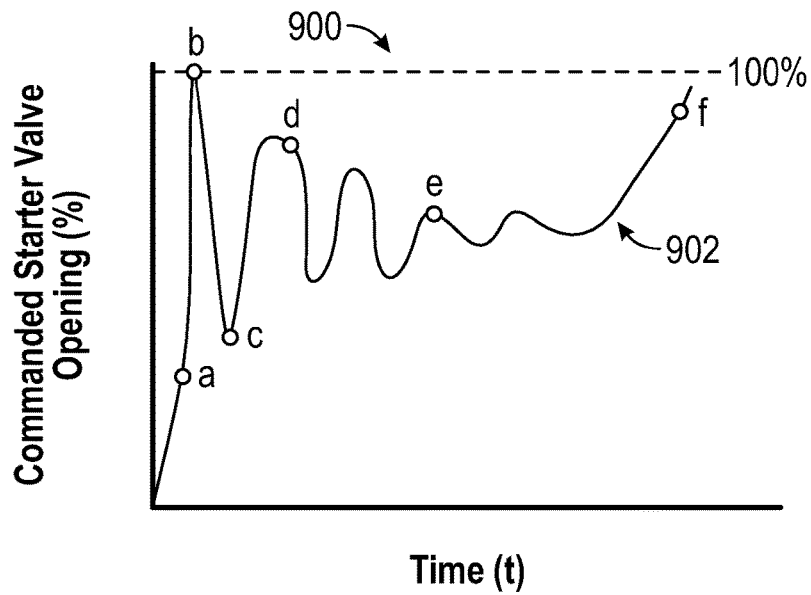
FIG. 12 is a graph illustrating commanded starter valve opening with respect to time in accordance with an embodiment of the disclosure.
Figure 13:
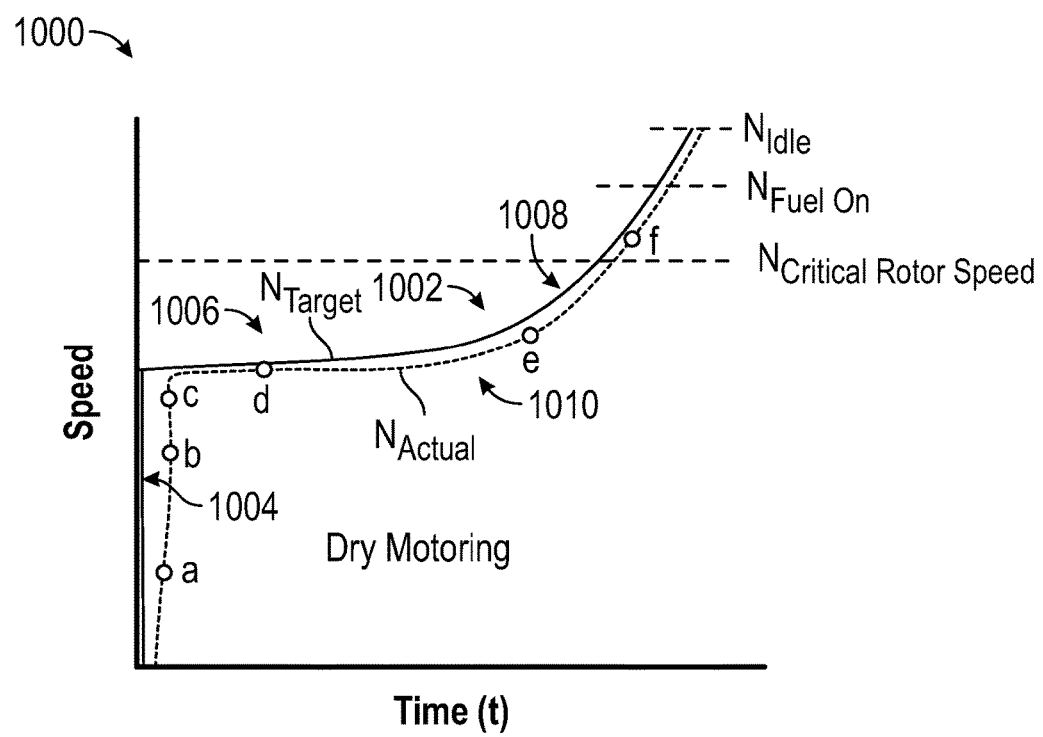
FIG. 13 is a graph illustrating a target rotor speed profile of a dry motoring profile and an actual rotor speed versus time in accordance with an embodiment of the disclosure.

The example of FIG. 12 illustrates how a valve angle command 902 can be adjusted between 0 to 100% of a commanded starter valve opening to generate the actual rotor speed 1010 of FIG. 13. As the actual rotor speed 1010 tracks to the steep initial transition portion 1004 of the target rotor speed profile 1002, the valve angle command 902 transitions through points "a" and "b" to fully open the variable position starter valve 116B. As the slope of the target rotor speed profile 1002 is reduced in the gradually increasing portion 1006, the valve angle command 902 is reduced between points "b" and "c" to prevent the actual rotor speed 1010 from overshooting the target rotor speed profile 1002. In some embodiments, decisions to increase or decrease the commanded starter valve opening is based on monitoring a rate of change of the actual rotor speed 1010 and projecting whether the actual rotor speed 1010 will align with the target rotor speed profile 1002 at a future time. If it is determined that the actual rotor speed 1010 will not align with the target rotor speed profile 1002 at a future time, then the valve angle of the variable position starter valve 116B is adjusted (e.g., increase or decrease the valve angle command 902) at a corresponding time. In the example of FIGS. 12 and 13, the valve angle command 902 oscillates with a gradually reduced amplitude between points "c", "d", and "e" as the actual rotor speed 1010 tracks to the target rotor speed profile 1002 through the gradually increasing portion 1006. As dry motoring continues, the overall homogenization of the engine 10 increases, which allows the actual rotor speed 1010 to safely approach the critical rotor speed without risking damage. The valve angle command transitions from point "e" to point "f" and beyond to further increase the actual rotor speed 1010 in the late acceleration portion 1008 above the critical rotor speed, through a fuel-on speed and an engine idle speed. By continuously increasing the actual rotor speed 1010 during dry motoring, the bowed rotor condition can be reduced faster than holding a constant slower speed.

In summary with reference to FIG. 4, as one example of an aircraft that includes systems as described herein, onboard model 202 and core temperature model 204 may run on controller 102 of the aircraft to track heat stored ($T_{core}$) in the turbine at the time of engine shutdown. Modeling of potential heat stored in the system may be performed as a turbine disk metal temperature model in the core temperature model 204. When the aircraft lands, engines typically operate at idle for a cool down period of time, e.g., while taxiing to a final destination. When an engine shutdown is detected, model state data can be logged by the DSU 104 prior to depowering. When the controller 102 powers on at a later time and model state data can be retrieved from the DSU 104, and the bowed rotor start risk model 206 can be updated to account for the elapsed time. When an engine start is requested, a bowed rotor risk can be assessed with respect to the bowed rotor start risk model 206. Extended dry motoring can be performed during an engine start process until the bow risk has sufficiently diminished. Peak vibrations can be checked by the mitigation monitor 214 during the start processes to confirm that bowed rotor mitigation successfully removed the bowed rotor condition.

In reference to FIGS. 4 and 13, the mitigation monitor 214 of FIG. 4 can operate in response to receiving a complete indicator 212 to run a verification of the bowed rotor mitigation. The mitigation monitor 214 can provide mitigation results 216 to the motoring controller 208 and may provide result metrics 218 to other systems, such a maintenance request or indicator. Peak vibrations can be checked by the mitigation monitor 214 during the start processes to confirm that bowed rotor mitigation successfully removed the bowed rotor condition. The mitigation monitor 214 may also run while dry motoring is active to determine whether adjustments to the dry motoring profile are needed. For example, if a greater amount of vibration is detected than was expected, the mitigation monitor 214 can request that the motoring controller 208 reduce a slope of the target rotor speed profile 1002 of FIG. 13 to extend the dry motoring time before driving the actual rotor speed 1010 of FIG. 13 up to the critical rotor speed. Similarly, if the magnitude of vibration observed by the mitigation monitor 214 is less than expected, the mitigation monitor 214 can request that the motoring controller 208 increase a slope of the target rotor speed profile 1002 of FIG. 13 to reduce the dry motoring time before driving the actual rotor speed 1010 of FIG. 13 up to the critical rotor speed.

Figure 5:
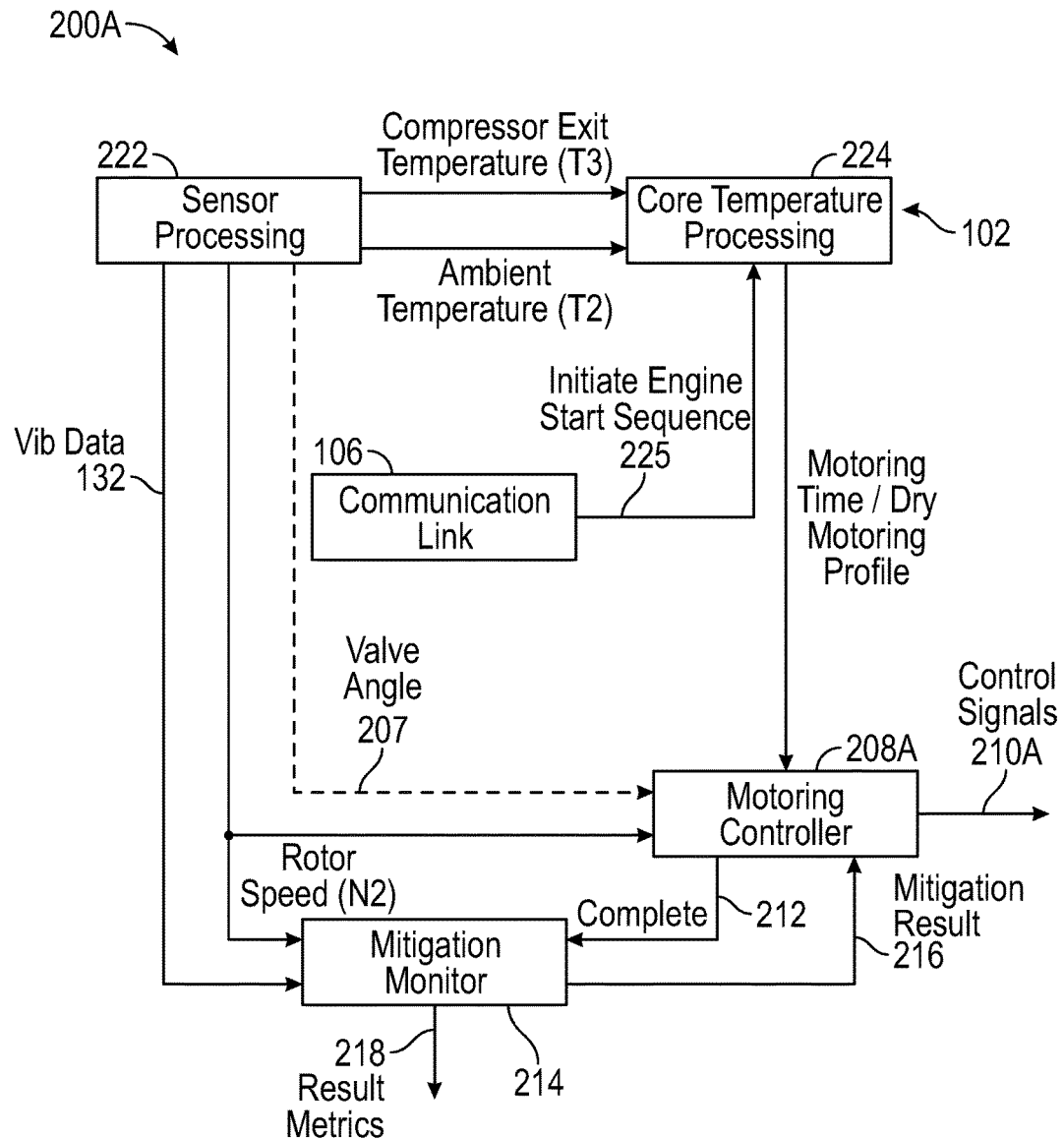
FIG. 5 is a block diagram of a system for bowed rotor start prevention in accordance with another embodiment of the disclosure.

FIG. 5 is a block diagram of a system 200A for bowed rotor start prevention in accordance with an embodiment that uses measured temperatures rather than the modeled temperatures of system 200 of FIG. 4. The system 200A may be implemented in the bowed rotor start prevention system 101 or 101A of FIGS. 2 and 3. In the example of FIG. 5, the system 200A includes sensor processing 222 operable to acquire and condition data from a variety of sensors such as the valve angle feedback 142, speed pickup 122, vibration pickup 128, and temperature sensors of FIGS. 2 and 3. In the example of FIG. 5, sensor processing 222 provides compressor exit temperature T3 and ambient temperature T2 to core temperature processing 224. Alternatively or additionally, one or more temperature values from stations 4 (T4), 4.5 (T4.5), and/or 5 (T5) can be provided to core temperature processing 224. Sensor processing 222 can provide valve angle 207 to a motoring control 208A based on the valve angle feedback 142. Sensor processing 222 can provide rotor speed N2 (i.e., speed of high speed spool 32) to the motoring controller 208A and mitigation monitor 214. Sensor processing 222 may also provide vibration data 132 to mitigation monitor 214. The sensor processing 222, core temperature processing 224, motoring controller 208A, and/or mitigation monitor 214 may be part of controller 102.

In some embodiments, a heat state of the engine 10 or $T_{core}$ is determined by the core temperature processing 224. When the gas turbine engine 10 has stopped rotating (e.g., rotor speed N2 is zero), the compressor exit temperature T3 may be substantially equal to $T_{core}$. In some embodiments, $T_{core}$ is set equal to T3−T2 to adjust the temperature with respect to the measured ambient temperature of the gas turbine engine 10. Further, temperature readings from other stations of the gas turbine engine 10 can be used to determine $T_{core}$. Communication link 106 can provide the core temperature processing 224 with an indication 225 that a start sequence of the gas turbine engine 10 has been initiated. Once rotation of the gas turbine engine 10 begins, temperature readings can be collected for a predetermined period of time, such as ten to thirty seconds. The temperature readings, e.g., T3 or T3−T2, can be averaged as core temperature $T_{core}$ before the temperature starts to change due to air flow from engine rotation. The core temperature processing 224 can determine a bowed rotor risk parameter that is based on the measured temperature using a mapping function or lookup table. The bowed rotor risk parameter can have an associated dry motoring profile defining a target rotor speed profile over an anticipated amount of time for the motoring controller 208A to send control signals 210A, such as valve control signals 110 for controlling variable position starter valve 116B of FIG. 3. For example, a higher risk of a bowed rotor may result in a longer duration of dry motoring to reduce a temperature gradient prior to starting the gas turbine engine 10 of FIG. 1.

In embodiments that use the starter valve 116A or 116B, the core temperature processing 224 can compute a motoring time and/or a dry motoring profile using techniques as described in reference to FIG. 4. Similar to the motoring controller 208 of FIG. 4, the motoring controller 208A of FIG. 5 can default to using the rotisserie motoring system 150 for bowed rotor prevention and only commands dry motoring using the dry motoring system 108 or 108A if a sufficient bowed rotor risk still remains on an engine start command. Thus, the motoring controller 208A can send control signals 210A initially to activate the rotisserie motoring system 150 (e.g., rotisserie mode enable 158) and send control signals 210A to perform dry motoring (using dry motoring system 108 or 108A) if needed.

Figure 6:
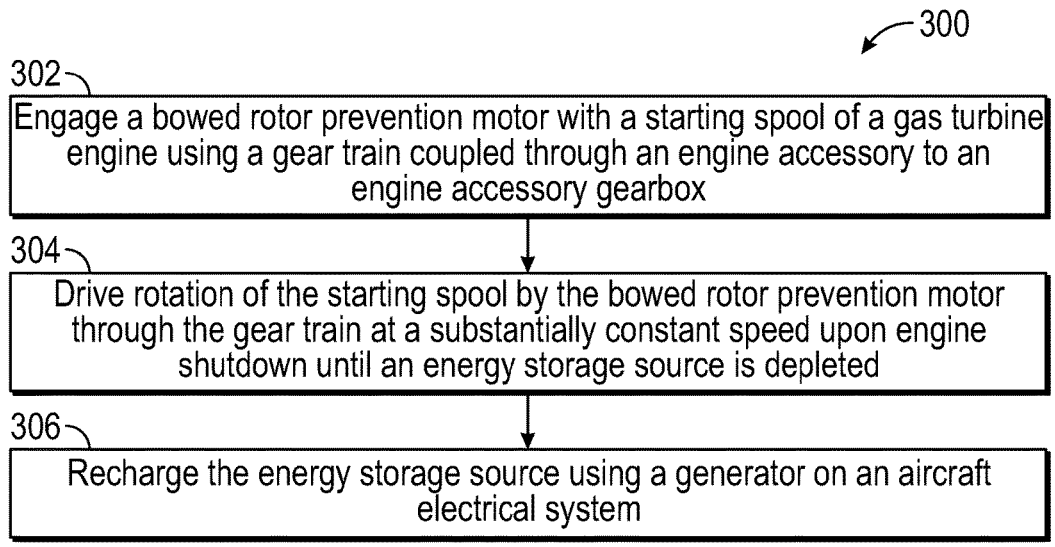
FIG. 6 is a flow chart illustrating a method of bowed rotor start prevention of a gas turbine engine in accordance with an embodiment of the disclosure.

FIG. 6 is a flow chart illustrating a method 300 of bowed rotor prevention of the gas turbine engine 10 in accordance with an embodiment using a bowed rotor prevention motor 152 as an auxiliary drive. The method 300 of FIG. 6 is described in reference to FIGS. 1-19 and may be performed with an alternate order and include additional steps. Before initiating bowed rotor prevention, a bowed rotor determination step can be performed to estimate a need for bowed rotor start prevention. Examples include the use of models and/or stored/observed engine/aircraft state data, such as data received from DSU 104, communication link 106, and/or reading data from one or more temperature sensors of the gas turbine engine 10 as previously described. Alternatively, bowed rotor prevention can be initiated on each engine shutdown event. Activation of bowed rotor prevention may be delayed, for instance, by delaying activation of the bowed rotor prevention motor 152 upon engine shutdown through delay circuit 164 such that a brief shutdown period (e.g., <15 minutes) before restarting does not result in activation of the bowed rotor prevention motor 152.

At block 302, the bowed rotor prevention motor 152 is engaged with a starting spool of the gas turbine engine 10 through a gear train 53. The gear train 53 can establish a linkage from the bowed rotor prevention motor 152 through transmission 154, engine accessory 157, engine accessory gearbox 124, and tower shaft 55 to the starting spool. At block 304, rotation of the starting spool is driven by the bowed rotor prevention motor 152 through the gear train 53. In some embodiments, rotation of the starting spool is driven by the bowed rotor prevention motor 152 through the gear train 53 at a substantially constant speed until energy storage source 160 is depleted or a bowed rotor prevention shutdown request 166 to halt rotation of the starting spool is received. The substantially constant speed may be between about 0.2 and 2 revolutions per minute. In some embodiments, the substantially constant speed is <=10 revolutions per minute. In other embodiments, rotation of the starting spool is driven by the bowed rotor prevention motor 152 through the gear train 53 at a varying speed and/or using electrical power from the auxiliary energy source 162. At block 306, the energy storage source 160 (when used) can be recharged at a later time, for instance, using the generator 170 of the aircraft electrical system after the gas turbine engine 10 starts. However, before the gas turbine engine 10 is started, bowed rotor prevention and/or mitigation are performed.

In an embodiment, the bowed rotor prevention motor 152 can be engaged and driven to rotate the starting spool based on one or more measured temperatures of the gas turbine engine 10. In other embodiments, a modeled parameter or an aircraft parameter can be used to set the rotisserie mode enable 158 such that energy (e.g., electricity) from the energy storage source 160 or the auxiliary energy source 162 passes through switch 156 to power the bowed rotor prevention motor 152. The aircraft parameter may be an engine shutdown request or other parameter from which a command to set the rotisserie mode enable 158 can be determined.

The bowed rotor prevention shutdown request 166 can be detected based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10. After detecting the bowed rotor prevention shutdown request 166, driving of rotation of the starting spool can be resumed based on determining that the bowed rotor prevention shutdown request 166 is no longer detected and the energy storage source 160 is not depleted. The controller 102 is operable to determine a bowed rotor prevention shutdown period defined as a time from when the bowed rotor prevention shutdown request 166 is detected until the bowed rotor prevention shutdown request 166 is no longer detected. The controller 102 can drive rotation of the starting spool based on the bowed rotor prevention shutdown period.

The controller 102 can determine whether dry motoring of the gas turbine engine 10 is needed, such as detecting premature depletion of the energy storage source 160 (without other available power from auxiliary energy source 162) or as part of an engine starting sequence based on determining that dry motoring is needed. For example, as depicted in scenario one 1100 of FIG. 16, when an airplane lands at noon as depicted on timeline 1102, the bowed rotor prevention motor 152 of the rotisserie motoring system 150 may be run continuously until engine restart or the energy storage source 160 is depleted according to timeline 1104. Since a bowed rotor prevention threshold condition is met (e.g., continuous motoring) according to timelines 1102 and 1104, dry motoring is not needed as depicted in timeline 1106 when an engine start is requested. In scenario two 1200 of FIG. 17, when an airplane lands at noon as depicted on timeline 1202, the bowed rotor prevention motor 152 of the rotisserie motoring system 150 may be run continuously until engine restart or the energy storage source 160 is depleted according to timeline 1204. As depicted on timeline 1204, a bowed rotor prevention shutdown period of about one hour occurs when the bowed rotor prevention shutdown request 166 is detected due to a maintenance action. When the bowed rotor prevention shutdown request 166 is no longer detected and the bowed rotor prevention shutdown period is determined, the controller 102 resumes run the bowed rotor prevention motor 152 of the rotisserie motoring system 150. Depending on the total time of the bowed rotor prevention shutdown period, the controller 102 may establish a minimum resume time limit (for instance, about 30 minutes) to declare that any bowing effects that occurred while the bowed rotor prevention motor 152 was inactive have been sufficiently mitigated. The bowed rotor prevention motor 152 may remain active beyond the minimum resume time limit until an engine restart or the energy storage source 160 is depleted. In the example of scenario two 1200, since the total time between resuming rotation of the bowed rotor prevention motor 152 and an engine start request is greater than the minimum resume time limit (i.e., 45 minutes>30 minutes in this example), dry motoring is not needed as indicated by timelines 1202, 1204, and 1206.

Figure 18:
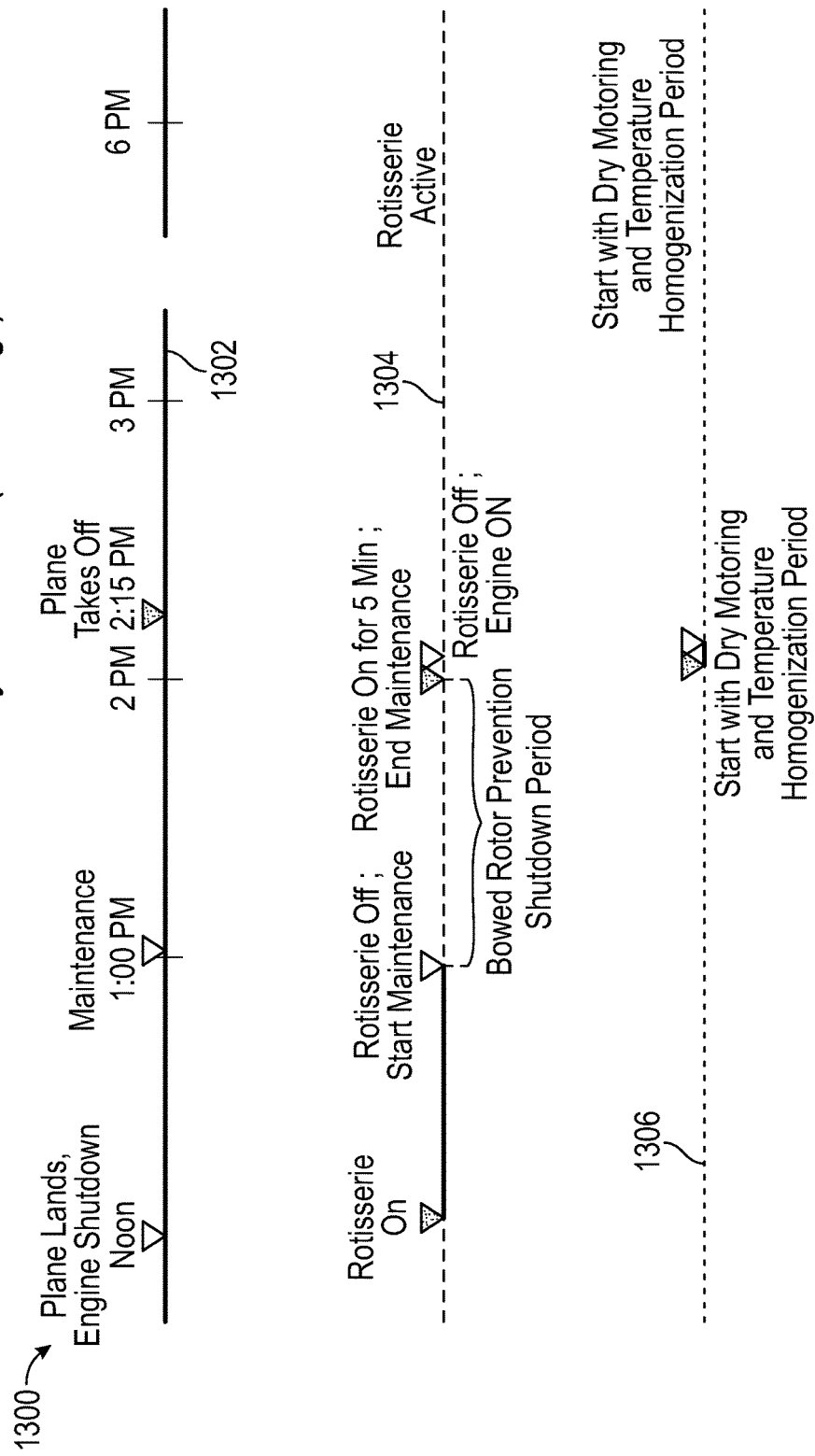
FIG. 18 depicts a third scenario example of bowed rotor prevention/mitigation in accordance with an embodiment of the disclosure.

As a further example, scenario three 1300 of FIG. 18 includes timelines 1302, 1304, and 1306 that illustrate maintenance starting about one hour after landing and completing in about one hour. In timeline 1304, only about five minutes of additional time is spent resuming rotation of the bowed rotor prevention motor 152 before an engine start request is received. Since the additional rotisserie motoring time was less than the minimum resume time limit (i.e., 5 minutes<30 minutes), dry motoring is performed for a temperature homogenization period when the engine start request is received as depicted in timelines 1304 and 1306.

Figure 19:
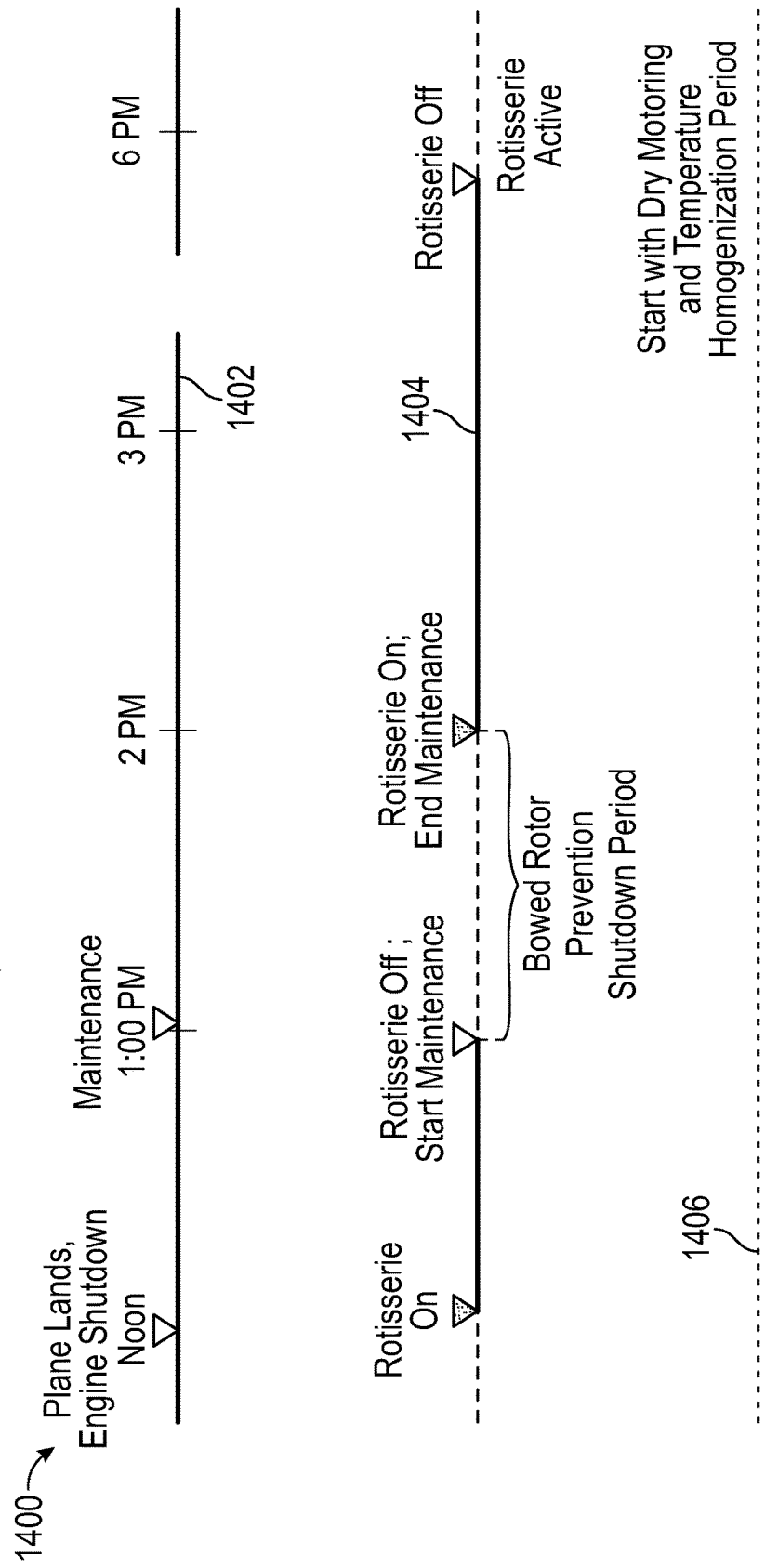
FIG. 19 depicts a fourth scenario example of bowed rotor prevention in accordance with an embodiment of the disclosure.

As an additional example, scenario four 1400 of FIG. 19 includes timelines 1402, 1404, and 1406 that illustrate maintenance starting about one hour after landing and completing in about one hour. In timeline 1404, rotation of the bowed rotor prevention motor 152 resumes and continues until a temperature or time limit is met or the energy storage source 160 is depleted. Since no further bowed rotor prevention shutdown request 166 is detected after the maintenance action, the rotisserie motoring system 150 is used until the risk of a bowed rotor condition has been removed, and thus the bowed rotor prevention threshold condition is met. Accordingly, dry motoring is not needed in scenario four 1400 as illustrated by timeline 1406.

When dry motoring is needed, as one example, risk model 206 can be used to determine a motoring time period $t_{motoring}$ for a start sequence of the gas turbine engine 10 as a temperature homogenization period, where the risk model 206 uses the recorded time of the engine shutdown and the stored heat state of the gas turbine engine 10 at shut down to determine the motoring time period $t_{motoring}$. The gas turbine engine 10 can be motored at a predetermined speed range of $N_{targetMin}$ to $N_{targetMax}$ during the motoring time period, which is less than a normal idle start speed N2. The controller 102 can dynamically vary a position of starter valve 116A, 116B during the motoring time period in order to motor the gas turbine engine 10 at the predetermined speed range of $N_{targetMin}$ to $N_{targetMax}$. The predetermined speed range of $N_{targetMin}$ to $N_{targetMax}$ may be tightly controlled to a substantially constant rotor speed or cover a wider operating range according to a dry motoring profile.

As an example with respect to FIGS. 3 and 13, the variable position starter valve 116B can be initially set to a valve angle of greater than 50% open when dry motoring is active. The controller 102 can monitor a rate of change of the actual rotor speed 1010, project whether the actual rotor speed 1010 will align with the target rotor speed profile 1002 at a future time based on the rate of change of the actual rotor speed 1010, and adjust a valve angle of the variable position starter valve 116B based on determining that the actual rotor speed 1010 will not align with the target rotor speed profile 1002 at a future time.

Further dynamic updates at runtime can include adjusting a slope of the target rotor speed profile 1002 in the dry motoring profile while the dry motoring mode is active based on determining that a vibration level of the gas turbine engine 10 is outside of an expected range. Adjusting the slope of the target rotor speed profile 1002 can include maintaining a positive slope.

Vibration levels may also or alternatively be used to check/confirm successful completion of bowed rotor start prevention prior to starting the gas turbine engine 10. For instance, based on determining that the bowed rotor start prevention is complete, a vibration level of the gas turbine engine 10 can be monitored while sweeping through a range of rotor speeds including the critical rotor speed.

In further reference to FIGS. 4 and 5, the mitigation monitor 214 may receive a complete indicator 212 from the motoring controller 208, 208A when the motoring controller 208, 208A has completed motoring, for instance, if the motoring time has elapsed. If the mitigation monitor 214 determines that the bowed rotor condition still exists based on vibration data 132 collected, the motoring controller 208, 208A may restart motoring (rotisserie motoring or dry motoring), or a maintenance request or indicator can be triggered along with providing result metrics 218 for further analysis. Metrics of attempted bowed rotor prevention/mitigation can be recorded in the DSU 104 based on determining that the attempted bowed rotor prevention/mitigation was unsuccessful or incomplete.

Figure 9:
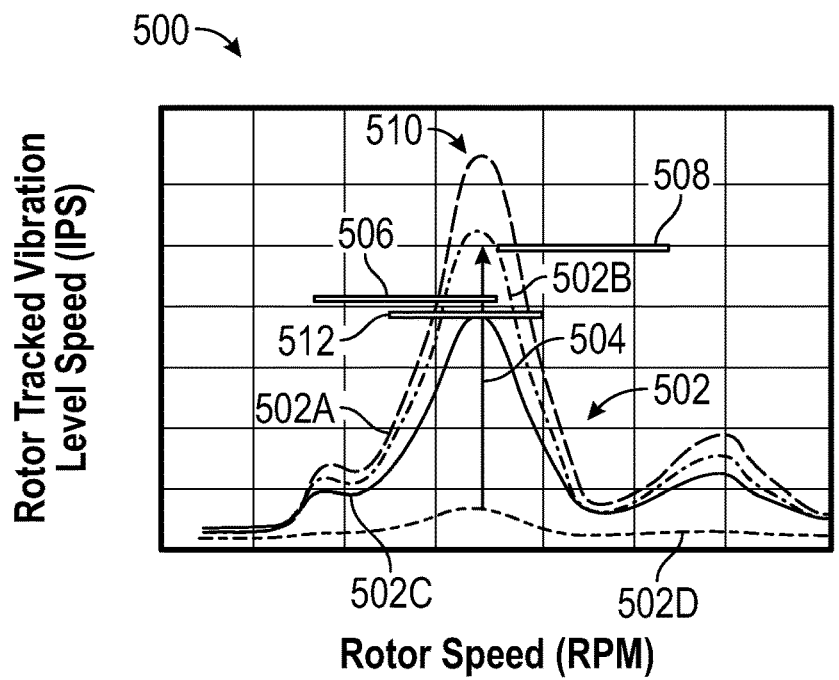
FIG. 9 is a graph illustrating examples of various vibration level profiles of an engine in accordance with an embodiment of the disclosure.

Referring now to FIG. 9, a graph 500 illustrating examples of various vibration level profiles 502 of an engine, such as gas turbine engine 10 of FIG. 1 is depicted. The vibration level profiles 502 represent a variety of possible vibration levels observed before and/or after performing bowed rotor mitigation. Critical rotor speed 510 is the speed at which a vibration peak is expected due to amplification effects of a bowed rotor condition along with other contributions to vibration level generally. A peak vibration 504 at critical rotor speed 510 may be used to trigger different events. For example, if the peak vibration 504 at critical rotor speed 510 is below a maintenance action threshold 506, then no further actions may be needed. If the peak vibration 504 at critical rotor speed 510 is above a damage risk threshold 508, then an urgent maintenance action may be requested such as an engine check. If the peak vibration 504 at critical rotor speed 510 is between the maintenance action threshold 506 and the damage risk threshold 508, then further bowed rotor mitigation actions may be requested, such as extending/restarting rotisserie or dry motoring. In one embodiment, a maintenance request is triggered based on the actual vibration level exceeding maintenance action threshold 506 after completing an attempt of bowed rotor mitigation.

The lowest rotor vibration vs. speed in FIG. 9 (vibration profile 502D) is for a fully homogenized rotor, where mitigation is not necessary (engine parked all night long, for example). The next higher curve shows a mildly bowed rotor and so on. The maintenance action threshold 506 is a threshold for setting a maintenance flag such as requiring a troubleshooting routine of one or more system elements. The damage risk threshold 508 may be a threshold to trigger a more urgent maintenance requirement up to and including an engine check. As motoring is performed in embodiments, the gas turbine engine 10 may shift between vibration profiles. For instance, when a bow rotor condition is present, the gas turbine engine 10 may experience vibration levels according to vibration profile 502A, if mitigation is not performed. As motoring is run, the gas turbine engine 10 may have a vibration profile that is gradually reduced from vibration profile 502A to vibration profile 502B and then vibration profile 502C, for example. By checking the current vibration level at a corresponding rotor speed with respect to time, the controller 102 can determine whether adjustments are needed to extend or reduce the slope of the target rotor speed profile 1002 of FIG. 13 depending on an expected rate of bowed rotor reduction. In embodiments, a slope of the target rotor speed profile 1002 in the dry motoring profile can be adjusted and maintains a positive slope while bowed rotor start prevention is active based on determining that a vibration level of the gas turbine engine 10 is less than a targeted maximum range 512, which may define a safe level of vibration to ensure that no risk of a maintenance action or damage will likely occur if the actual rotor speed 1010 is increased faster than previously planned.

Accordingly and as mentioned above, it is desirable to detect, prevent and/or clear a "bowed rotor" condition in a gas turbine engine that may occur after the engine has been shut down. As described herein and in one non-limiting embodiment, the controller 102 may be programmed to automatically take the necessary measures in order to provide for a modified start sequence without pilot intervention other than the initial start request. In an exemplary embodiment, the controller 102 and/or DSU 104 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the controller 102 and/or DSU 104 may include, but not be limited to, a processor(s), computer(s), memory, storage, register(s), timing, interrupt(s), communication interfaces, and input/output signal interfaces, as well as combinations comprising at least one of the foregoing. For example, the controller 102 and/or DSU 104 may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor prevention system for a gas turbine engine of an aircraft, the bowed rotor prevention system comprising:
   an engine accessory comprising a pump;
   a gear train coupled through the engine accessory to an engine accessory gearbox that is further coupled to a starting spool of the engine, wherein the gear train comprises a transmission with an epicyclic gear set coupled to a drive portion of the engine accessory; and
   a bowed rotor prevention motor operable to drive rotation of the starting spool of the gas turbine engine through the drive portion of the engine accessory and the gear train upon engine shutdown, wherein the transmission is interposed between the bowed rotor prevention motor and the engine accessory gearbox.

2. The bowed rotor prevention system as in claim 1, wherein the gear train comprises a back-drive preventer that isolates the bowed rotor prevention motor from rotatable components of the gas turbine engine to inhibit the bowed rotor prevention motor from being back-driven.

3. The bowed rotor prevention system as in claim 2, wherein the back-drive preventer is a clutch.

4. The bowed rotor prevention system as in claim 1, wherein the bowed rotor prevention motor is an electric motor.

5. The bowed rotor prevention system as in claim 4, wherein an energy storage source is used to drive the electric motor, and the energy storage source is rechargeable by a generator on an aircraft electrical system.

6. The bowed rotor prevention system as is claim 4, wherein the bowed rotor prevention motor is further operable to be driven by electrical power from an auxiliary energy source.

7. The bowed rotor prevention system as in claim 1, wherein the bowed rotor prevention motor is further operable to drive rotation of the starting spool until a bowed rotor prevention shutdown request is detected, wherein the bowed rotor prevention shutdown request is detected based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

8. The bowed rotor prevention system as in claim 1, wherein the epicyclic gear set has a reduction ratio between 100:1 and 10,000:1.

9. The bowed rotor prevention system as in claim 1, wherein the epicyclic gear set is integrated with the engine accessory.

10. The bowed rotor prevention system as in claim 1, further comprising a delay circuit operable to delay activation of the bowed rotor prevention motor upon engine shutdown.

11. A gas turbine engine of an aircraft, the gas turbine engine comprising:
    a starting spool coupled to an engine accessory gearbox;
    a gear set coupled through an engine accessory to the engine accessory gearbox, wherein the engine accessory comprises a pump, and the gear set comprises a transmission coupled to a drive portion of the engine accessory; and
    a bowed rotor prevention motor operable to drive rotation of the starting spool through the gear set and the drive portion of the engine accessory gearbox upon engine shutdown, wherein the transmission is interposed between the bowed rotor prevention motor and the engine accessory gearbox.

12. The gas turbine engine of claim 11, wherein the bowed rotor prevention motor is further operable to drive rotation of the starting spool until a bowed rotor prevention shutdown request is detected, wherein the bowed rotor prevention shutdown request is detected based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

13. The gas turbine engine of claim 11, wherein the gear set is an epicyclic gear set, and the gear set comprises an over-running clutch to prevent the bowed rotor prevention motor from being back-driven.

14. The gas turbine engine of claim 11, wherein the gear set is integrated with the engine accessory.

15. A method for bowed rotor prevention for a gas turbine engine of an aircraft, the method comprising:
    engaging a bowed rotor prevention motor with a starting spool of the gas turbine engine using a gear train coupled through an engine accessory to an engine accessory gearbox, wherein the engine accessory comprises a pump, and the gear train comprises a transmission with an epicyclic gear set coupled to a drive portion of the engine accessory; and
    driving rotation of the starting spool by the bowed rotor prevention motor through the drive portion of the engine accessory and the gear train upon engine shutdown, wherein the transmission is interposed between the bowed rotor prevention motor and the engine accessory gearbox.

16. The method as in claim 15, wherein the bowed rotor prevention motor is an electric motor and an energy storage source operable to drive the electric motor is a battery or a capacitor, and the method further comprises:
    recharging the energy storage source using a generator on an aircraft electrical system.

17. The method as in claim 15, further comprising:
    driving rotation of the starting spool until a bowed rotor prevention shutdown request is detected, wherein the bowed rotor prevention shutdown request is detected based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

18. The method as in claim 15, further comprising:
    delaying activation of the bowed rotor prevention motor upon engine shutdown through a delay circuit.

* * * * *